United States Patent [19]

Wilson, Jr. et al.

[11] Patent Number: 4,766,536
[45] Date of Patent: Aug. 23, 1988

[54] COMPUTER BUS APPARATUS WITH DISTRIBUTED ARBITRATION

[75] Inventors: James A. Wilson, Jr., Sunnyvale; David H. Bernstein, Los Altos, both of Calif.

[73] Assignee: Rational, Santa Clara, Calif.

[21] Appl. No.: 15,114

[22] Filed: Feb. 17, 1987

Related U.S. Application Data

[63] Continuation of Ser. No. 602,154, Apr. 19, 1984, abandoned.

[51] Int. Cl.[4] .............................................. G06F 13/26
[52] U.S. Cl. ................................................... 364/200
[58] Field of Search ... 364/200 M.S. FILE, 900 M.S. FILE

[56] References Cited

U.S. PATENT DOCUMENTS

| | | | |
|---|---|---|---|
| 3,993,981 | 11/1976 | Cassarino et al. | 364/200 |
| 4,004,283 | 1/1977 | Bennett et al. | 364/200 |
| 4,009,470 | 2/1977 | Danilenko et al. | 364/200 |
| 4,016,548 | 4/1977 | Law et al. | 364/200 |
| 4,032,899 | 6/1977 | Jenny et al. | 364/200 |
| 4,067,059 | 1/1978 | Derchak | 364/200 |
| 4,096,571 | 6/1978 | Vander Mey | 364/200 |
| 4,121,285 | 10/1978 | Chen | 364/200 |
| 4,334,288 | 6/1982 | Booher | 364/900 |
| 4,408,300 | 10/1983 | Shima | 364/900 |
| 4,494,192 | 1/1985 | Lew et al. | 364/200 |
| 4,511,959 | 4/1985 | Nicolas et al. | 364/200 |

Primary Examiner—David Y. Eng
Attorney, Agent, or Firm—Blakely, Sokoloff, Taylor & Zafman

[57] ABSTRACT

A bus apparatus for interconnecting a plurality of nodes is disclosed. The nodes may comprise processors, input-/output subsystems, or the like. Each node maintains a unique priority number; the priority numbers are determined independently by each node. Separate updating of the priority numbers occurs for acknowledgement packets as compared to data transmissions. This provides for quick, efficient acknowledgement of transmissions and does not unfairly penalize a popular receiving node. Two different interface circuits are described, one particularly suitable for use with an input/output subsystem, and the other for a processor.

2 Claims, 15 Drawing Sheets

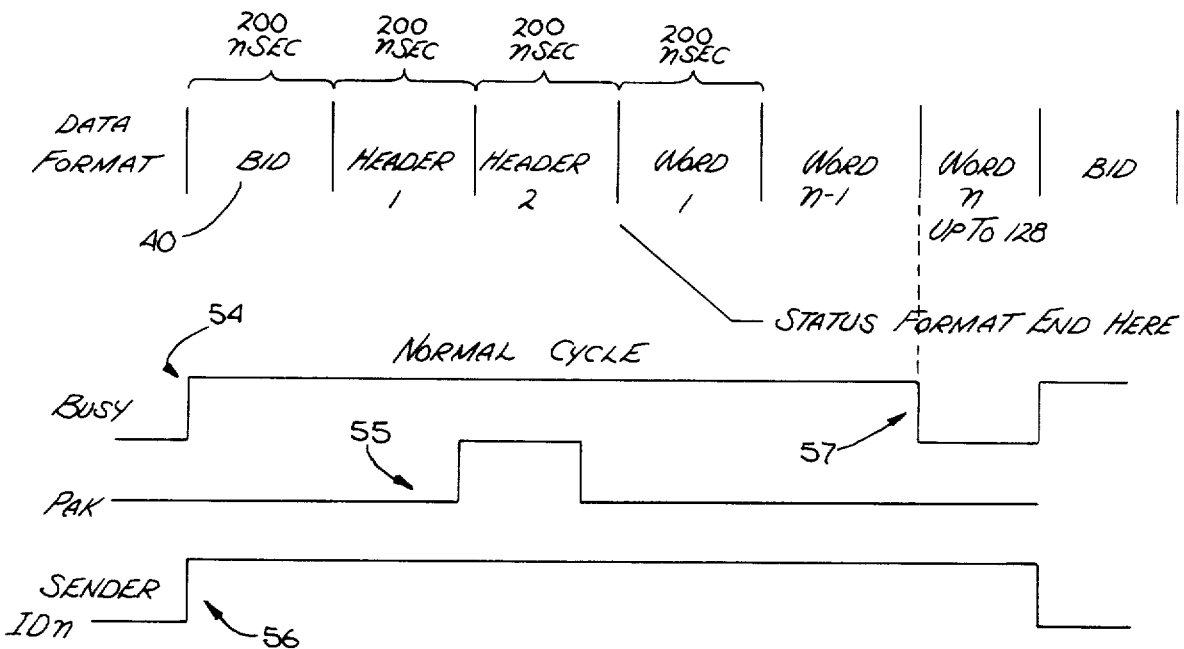
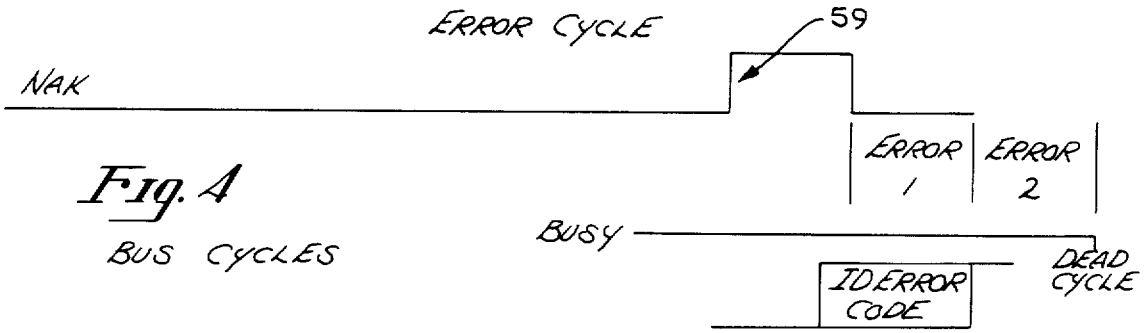
Fig. 4
BUS CYCLES
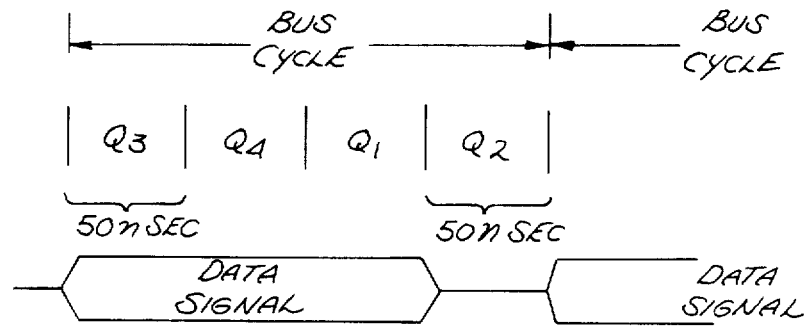
Fig. 5
CYCLE TIMING

I/D LINES
- 0 — NO PAK
- 1 — NOT USED
- 2 — RECEPTION DISABLED
- 3 — NODE IN DIAG. FREEZE
- 4 — MULTIPLE SENDERS
- 5 — INCONSISTENT LENGTH
- 6 — NO RECEIVE BUFFER READY
- 7 — PARITY ERROR

Fig. 6  ERROR CYCLE 1 SIGNALS

Fig. 8 BUS BIDDING
| | PRIORITY NUMBER | 20a | | | |
|---|---|---|---|---|---|
| STATUS | 0 | 7FFF | FFFF | FFFF | FFFF |
| | 1 | BFFF | " " | " " | " " |
| | 2 | DFFF | " " | " " | " " |
| | 3 | EFFF | " " | " " | " " |
| | 4 | F7FF | " " | " " | " " |
| | 5 | FBFF | " " | " " | " " |
| | 6 | FDFF | " " | " " | " " |
| | 7 | FEFF | " " | " " | " " |
| DATA | 0 | FF7F | " " | " " | " " |
| | 1 | FFBF | " " | " " | " " |
| | 2 | FFDF | " " | " " | " " |
| | 3 | FFEF | " " | " " | " " |
| | 4 | FFF7 | " " | " " | " " |
| | 5 | FFFB | " " | " " | " " |
| | 6 | FFFD | " " | " " | " " |
| | 7 | FFFE | " " | " " | " " |
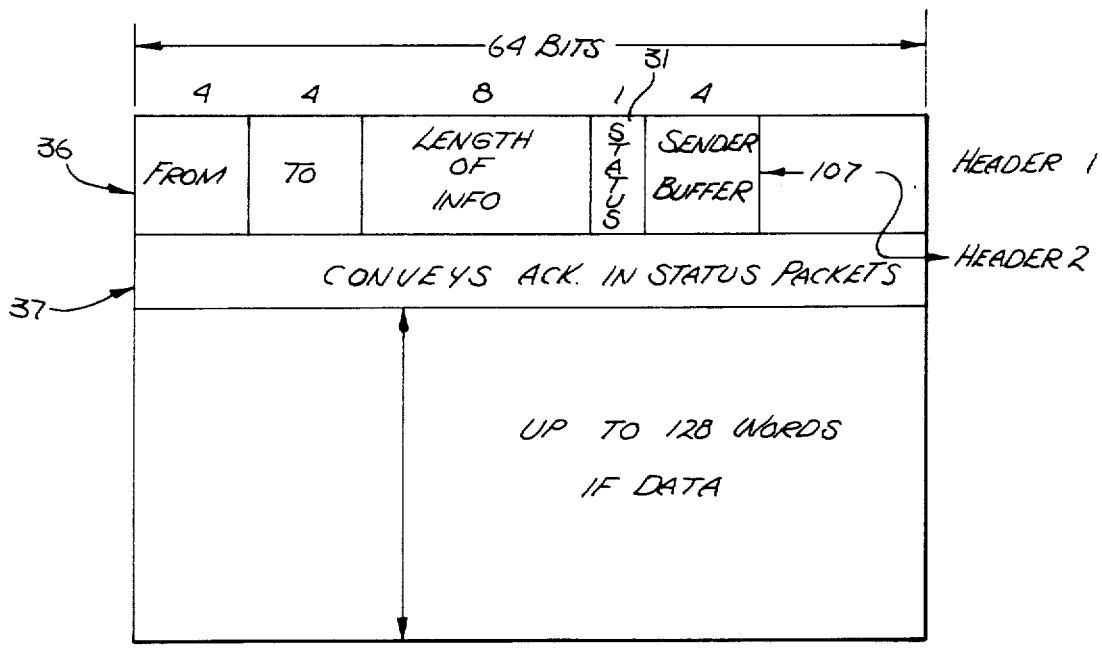
Fig. 9 PACKET ORGANIZATION

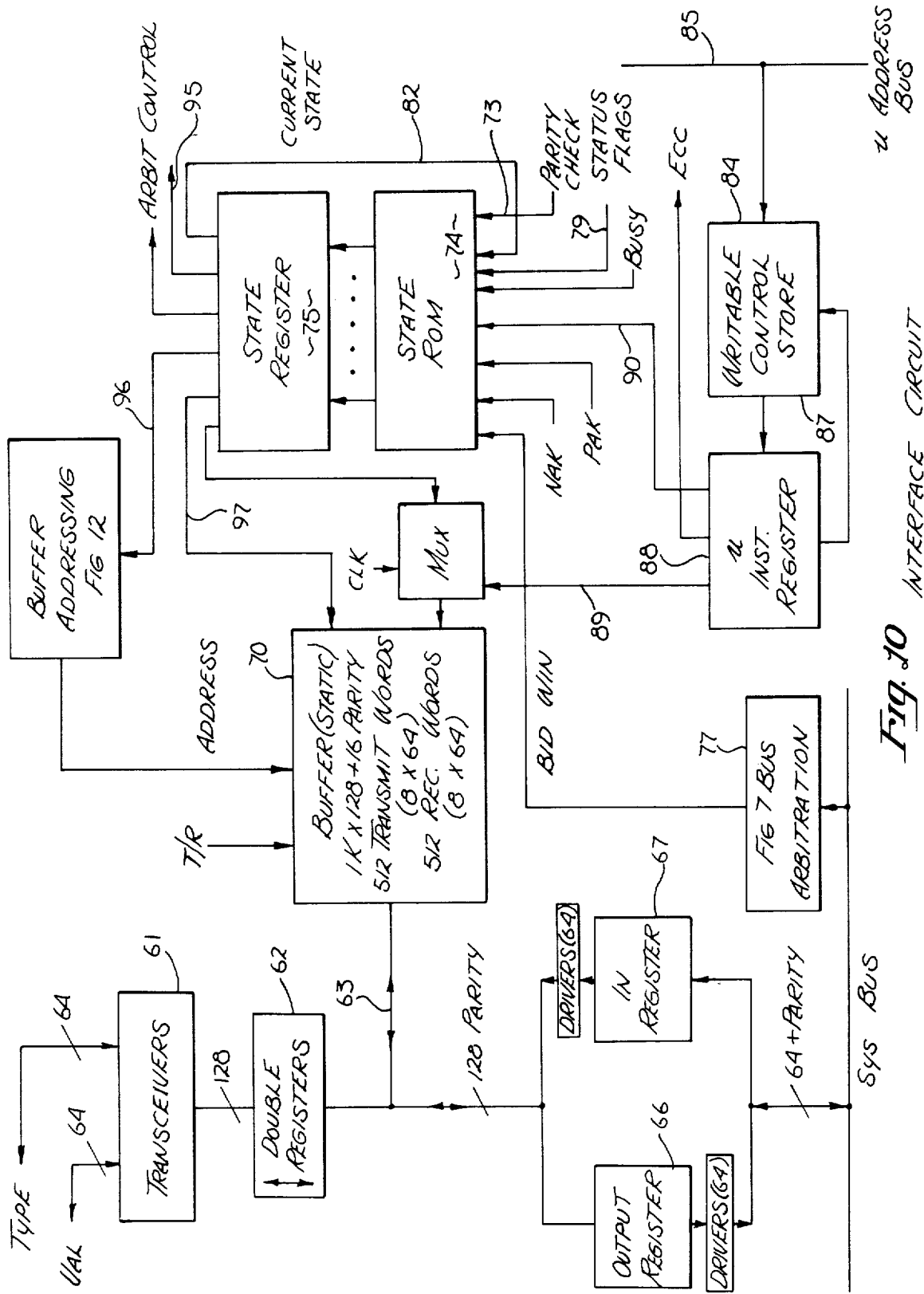
Fig. 10 INTERFACE CIRCUIT

COMPUTER BUS APPARATUS WITH DISTRIBUTED ARBITRATION

This is a continuation of application Ser. No. 602,154 filed Apr. 19, 1984, now abandoned.

BACKGROUND OF THE INVENTION

1. Field of the Invention

The invention relates to electrical buses which serve as a common communications link between a plurality of nodes.

2. Prior Art

A common bus which may comprise a single coaxial cable, a plurality of lines, or other configurations is frequently used to provide communications among a plurality of nodes. In a typical application, terminals, a central processing unit, or coprocessors, mass storage means, and other equipment are linked by the common bus. There are many prior art techniques which permit the nodes to share the bus on a time division basis.

In one technique, no central control for bus access is used. Each node is able to detect if the bus is in use, and if it is not in use, a node desiring bus access begins transmitting. Each node includes circuitry to detect a collision condition on the bus, that is, more than a single node transmitting at the same time. When collisions are detected, retransmission is tried at randomized time intervals. A popular version of this technique is referred to as "Ethernet". This technique is more adaptable for local area networks and where maximizing the number of transmissions over the bus is not necessary.

In another arrangement, each node is permitted access to the bus during predetermined periods or when the node has possession of a "token". The token is passed from node-to-node in a predetermined order or a dynamic ordering is used based on priorities.

In other systems, a centralized arbitration means is used to determine which of the nodes should be given access to the bus. Many different queuing and priority arrangements are in use.

As will be seen, the present invention employs a distributed arbitration means where each node independently determines its priority (rotating priority) and where each node maintains a unique priority.

Various protocols are used on bus systems to indicate that a transmission has been received. This acknowledgement, particularly for long transmissions, can acknowledge, for instance, that the received data has not only been received but verified through use of a parity check or error detection code. One problem that occurs in some systems is that a popular receiving node is penalized when it makes acknowledgement transmission. Such transmissions can lower the node's priority and greatly hinder the node's ability to transmit its own data. As will be seen, the invented bus apparatus employs a two-level priority arrangement. Nodes are not penalized in the priority arrangement for transmitting of required acknowledgements. This fairer protocol prevents a popular receiving node from being penalized merely because it is the destination for many transmissions.

In general, those bus systems which have distributed control for bus accessing such as Ethernet, have more flexibility. One problem with distributed control, however, is that it is difficult to detect the origin of a failure. Thus, for instance, if one node continually seizes control of the bus or interferes with the transmissions of other nodes, it may be difficult to determine which node is causing the problem. As will be seen, the invented bus apparatus includes error means for identifying bus problems and further, for identifying nodes associated with, for instance, a collision condition.

In general, when compared to the prior art the invented bus permits very efficient use of the bus with fair access permitted by all nodes in a highly reliable manner.

SUMMARY OF THE INVENTION

A bus apparatus for interconnecting a plurality of nodes is described. The bus includes a plurality of lines which are coupled to each node. The nodes gain access to the lines under control of an arbitrator. The arbitrator includes a memory for storing the nodes current priority. When a node is ready to transmit over the lines, it bids for the line by transmitting its current priority over the lines. All nodes sense the priorities of the bidding nodes. The bidding node with the highest priority takes ownership of the bus. All nodes after sensing the priority of the bidding nodes adjust their priority in a predetermined arrangement so that each node continues to have a unique priority. Consequently, the arbitration for the bus is distributed among the nodes with a rotating priority being determined independently by each node.

In the currently preferred embodiment, two different priority updating mechanisms are employed. If a node transmits an acknowledgement message, its priority is not lowered. This prevents the node from being penalized simply because it is the destination of data from other nodes.

The invented bus apparatus includes many other novel features which are described in detail in the main body of the specification.

BRIEF DESCRIPTION OF THE DRAWINGS

FIG. 4 illustrates waveforms of control signals transmitted over the bus lines during a normal bus cycle and during an error cycle.

FIG. 5 illustrates waveforms of cycle timing for signals transmitted over the bus lines.

FIG. 6 is a list identifying signals transmitted over the bus lines during an error cycle.

FIG. 8 is a list identifying signals transmitted over the bus lines during a bidding cycle.

FIG. 9 is a chart illustrating message packet organization for the present invention.

FIG. 10 is a block diagram of the interface circuit used in the present invention to interface between processor nodes and the bus lines.

DETAILED DESCRIPTION OF THE INVENTION

A bus apparatus particularly suited for use in a computer is described. In the following description, numerous specific details are set forth such as specific number of bus lines, waveforms, etc., to provide a thorough understanding of the present invention. It will be obvious, however, to one skilled in the art that the present invention may be practiced without these details. In other instances, well known circuits have not been described in detail in order not to unnecessarily obscure the present invention.

OVERVIEW OF BUS APPARATUS

As currently implemented, the bus apparatus of the present invention is used to interconnect a plurality of processors and other computer systems which are used primarily as input and output means for the processors. The bus apparatus includes a plurality of bus lines identified as system bus 20 in FIG. 1 for forming conductive paths between interface circuits such as circuits 25 and 26, and adapter circuits such as circuits 27 and 28. In practice, the bus 20 comprises lines formed on a printed circuit board into which the circuits are plugged in what is frequently referred to as a "back-plane" arrangement. In its currently fabricated form, the entire bus apparatus including the system bus 20, interface circuits and adapter circuits are housed in a single cabinet.

As currently fabricated, four processors such as processor P0 (21) through processor P3 (22) are coupled to the system bus through their respective interface circuits. Each processor includes a central processing unit and memory. The overall architecture of the processor is described in copending appliction, Ser. No. 506,052, filed June 20, 1983, entitled MEMORY SYSTEM, now abandoned although as will be evident, other processors may be employed. The memory systems employed within each processor is described in copending application, Ser. No. 701,190, filed Feb. 13, 1985, entitled "HIGHER ORDER LANGUAGE-DIRECTED COMPUTER," now abandoned. Both these applications are assigned to the assigneee of this application.

Figure 1:
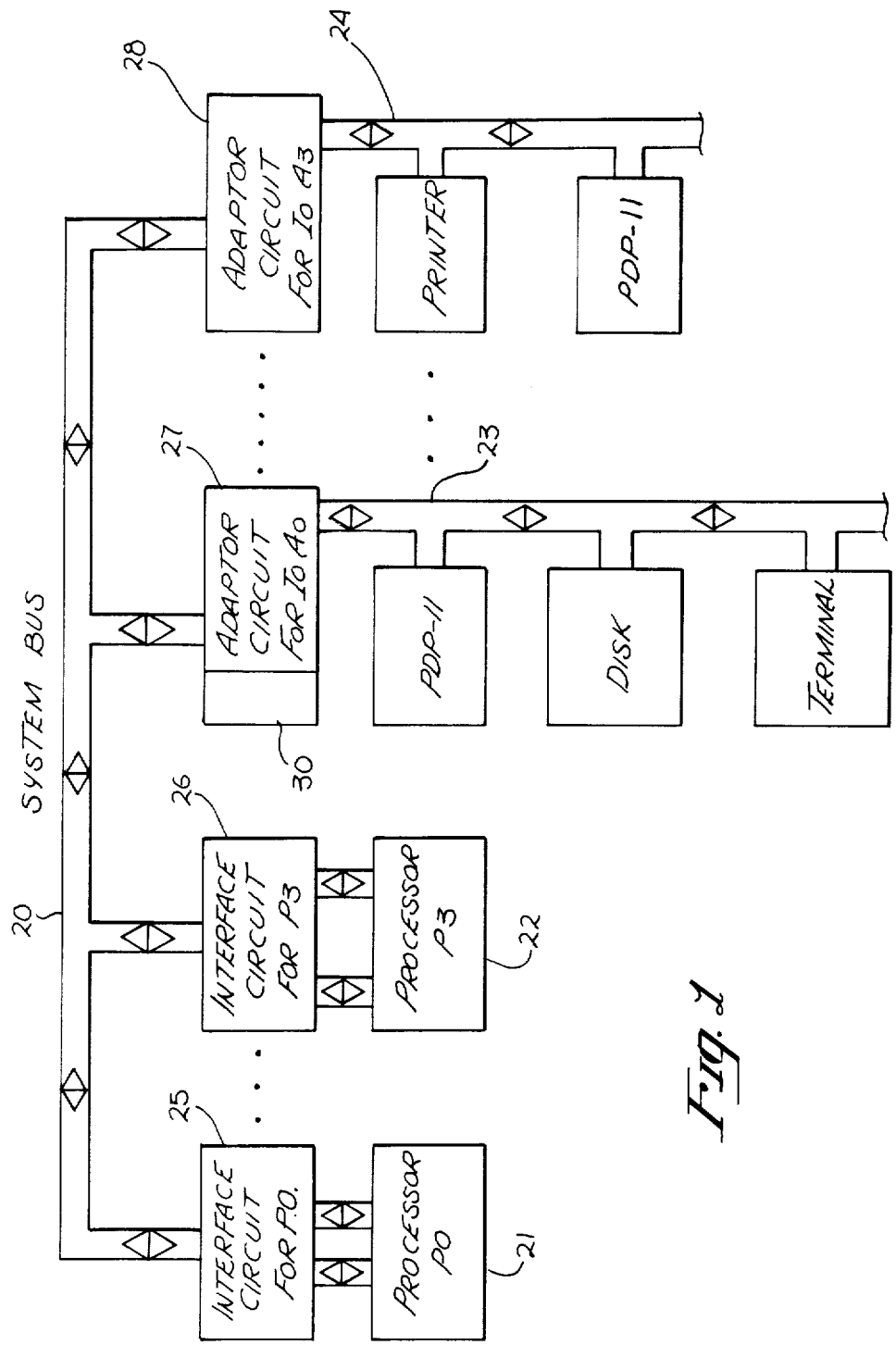
FIG. 1 is an overall block diagram showing the bus apparatus of the present invention and its interconnection to nodes.

Also, as currently fabricated, the invented bus apparatus interfaces with up to four input/output subsystems such as the buses 23 and 24 of FIG. 1, although this number is not critical to the present invention. Buses 23 and 24 are coupled to the system bus through adapter circuits such as circuits 27 and 28. In the currently preferred embodiment, the buses 23 and 24 are "Unibuses" and a PDP 11 computer is used to handle input and output chores. Other peripherals are coupled to these input/output buses 23 and 24 such as disk drives, terminals, printers, etc. The particular input/output means employed with the invented bus apparatus is not critical.

For purposes of discussion in the following application, the word "nodes" is used to identify the junctions at which processes, etc., are interfaces to the bus apparatus of the present invention. As will be seen, for the most part, the nodes are treated the same, that is, the processors coupled to the bus apparatus are treated in a similar manner to the input/output means (e.g., buses 23 and 24). As presently implemented, all the interface circuits are identical and all the adapter circuits are identical except for adapter circuit 27 identified as $I_O$, $A_O$. Circuit 27 includes additional circuits 30 used for cluster management (i.e., system management) such as initialization on powering up (including priority numbers discussed later), initial program loading, clock signal generation, panel interface, diagnostics, modem interface, power supply interface, etc.

As presently implemented, any of the processors may communicate with any of the other processors or any of the input/output means. Communications between input/output means (such as between bus 23 and bus 24) is not employed, although it could be used with the present invention.

Figure 2:
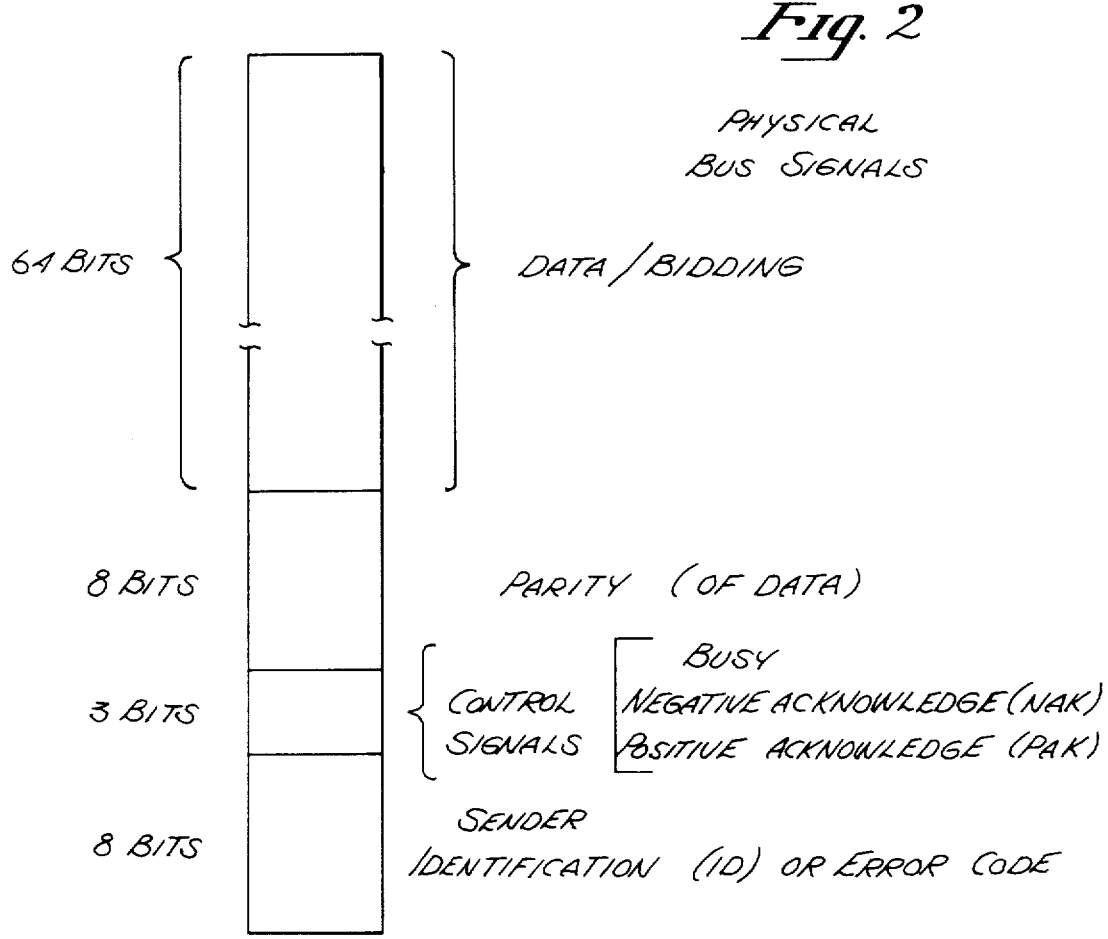
FIG. 2 is a diagram describing the signals carried on the bus lines interconnecting the nodes of FIG. 1.

As mentioned, bus 20 comprises a plurality of ordinary parallel conductors used to transmit (in parallel) the signals identified in FIG. 2. 64 lines are used to transmit data; these lines are also used during the bidding cycles to transmit signals representing priority. 8 lines transmit the 8 parity bits for the 64-bits of data. Three lines are used for control signals, specifically BUSY, NEGATIVE ACKNOWLEDGE (NAK) and POSITIVE ACKNOWLEDGE (PAK). Eight lines are used to allow each of the 8 nodes to identify itself during transmission (sender identification or ID). These latter lines are also used for transmitting the error codes set forth in FIG. 6.

PROTOCOL LAYERS

Figure 3:
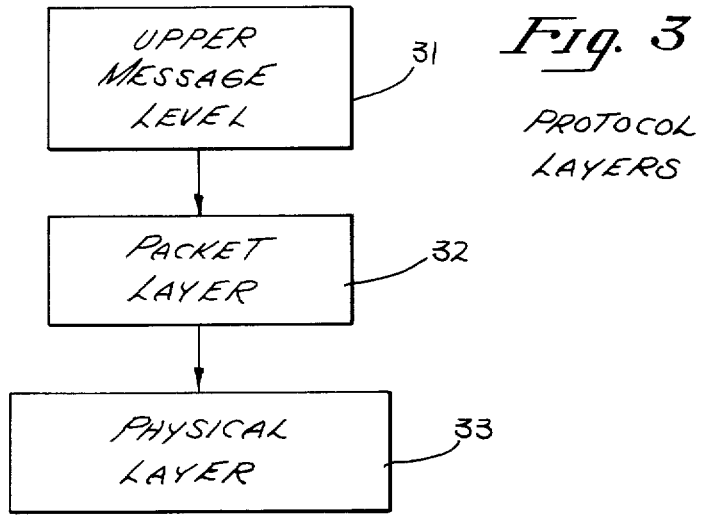
FIG. 3 is a block diagram of the various protocol levels employed in the invented bus apparatus.

In the presently preferred embodiment, three levels of protocol are used as shown in FIG. 3. For the most part, the teachings of the present invention involve the physical layer 33. However, a brief description of the upper message level 31 and packet layer 32 are included where necessary to understand the present invention. For each of these protocol layers or levels, a peer-to-peer protocol is defined. The uppermost level 31 allows objects of arbitrary length and content to be transferred among the nodes on the bus. This level is completely implemented by computer programs in the presently preferred embodiment (both in "software" program and microcode) in each of the processors, no direct support is provided for this protocol level by the interface circuits or adapter circuits shown in FIG. 1.

The packet layer 32 transports bounded-length message segments between the nodes. The packet organization will be described in detail in conjunction with FIG. 9. This layer includes an optional mechanism for certified delivery using status packets which convey positive or negative acknowledgement. (This acknowledgement is *not* the NAK and PAK signals of FIG. 3). The acknowledgement packets will be discussed in more detail. It is important to note that deadlock is averted by statically allocating resources for these status packets. In this way, data transmission priorities are not hindered by the transmission of such packets. Certain node operations, specifically page fault service, bypass the upper message level 31 and interface directly with the packet layer to limit overhead.

The physical layer 33 manages the flow of data across the electrical conductors (i.e., bus 20 of FIG. 1) and provides the synchronization, bus arbitration, error checking and functions related with this physical transfer.

PACKET ORGANIZATION

Two packet types are defined within the packet layer 32; data packets and status packets. Both the data and status packets have two 64-bit header words (header 36 and header 37 of FIG. 9). The data packets also have up to 128 64-bit words. The first four bits of the first header 36 convey the address of the sending node, the second four bits are the address of the receiving node. The following eight bits convey the length of the information to be transmitted, that is, up to a 128 words of data. This length is 0 for the status packets. The next bit 39 indicates whether the transmission is status or data (it is possible to have a zero length data transmission). The next four bits provide sender buffer information. This permits a match to be made between a received status packet and a previously transmitted data packet. The remaining bits for header 1 and header 2 are not defined at this protocol level but are used primarily to convey acknowledgement of status packets.

Those data packets transmitted without certified acknowledgement are simply presented to the physical layer 33 which queues them for transmission. The packet layer 32 is informed if the physical layer detects certain errors during the transmission, but otherwise is unaware of the packet's progress. The packet layer initiates a timer when presenting the physical layer with a packet to be transmitted with certification. Generally, the packet is acknowledged or a physical layer error is detected. (The timeout is used if a package acknowledgement is not received (when required) and no error is detected at the physical layer.) A status packet "matched" to a data transmission is sent when a data packet is acknowledged. These are the status packets indicated as such by the bit at location 39 of FIG. 9. (In the case of the adapter circuits, dynamic allocations of buffering occurs, thus permitting one processor to send many consecutive transmissions to the same input/output means.)

BUS CYCLE

In the physical layer, transmission over the system bus 20 is divided into bus cycles each of which has a duration of 192 nsec. In FIG. 5, these bus cycles are shown divided into four quarters each having a duration of approximately 50 nsec. A four phase clock signal is used which is provided for the entire system by the circuit 30 of adapter circuit 27 (FIG. 1). Standard TTL tristate drivers are employed for driving the bus. To prevent bus fighting and to otherwise accommodate the characteristics of the bus, no node may actively drive the bus during the second quarter (Q2) of any bus cycle as shown in FIG. 5. A node sending signals drives the bus without transition from the third quarter of a cycle through the end of a first quarter of the next cycle. Nodes receiving signals strobe the bus by the end of the fourth quarter of the cycle. The above timing applies to the 64-bits of data/bidding and 8 bits of parity of FIG. 2. The three control signals and the 8 ID signal are driven with open-collector drivers, hence, no idle quarter is required.

To maximize the bus utilization, neither a sending node nor a receiving node can delay transmission of data or status packet once it has begun. Consequently, the physical layer transmits packets from dedicated buffers in the sending node and stores them in dedicated buffers in the receiving node. These static buffers are shown as buffers 70 in FIG. 10 and will be described later. Each of these buffers provide 2K×64 bits of storage and the packet layer protocol can reference these buffers directly, enabling them to fabricate packets for transmission and inspect newly received packets without additional data movement.

BUS ARBITRATION

Figure 7:
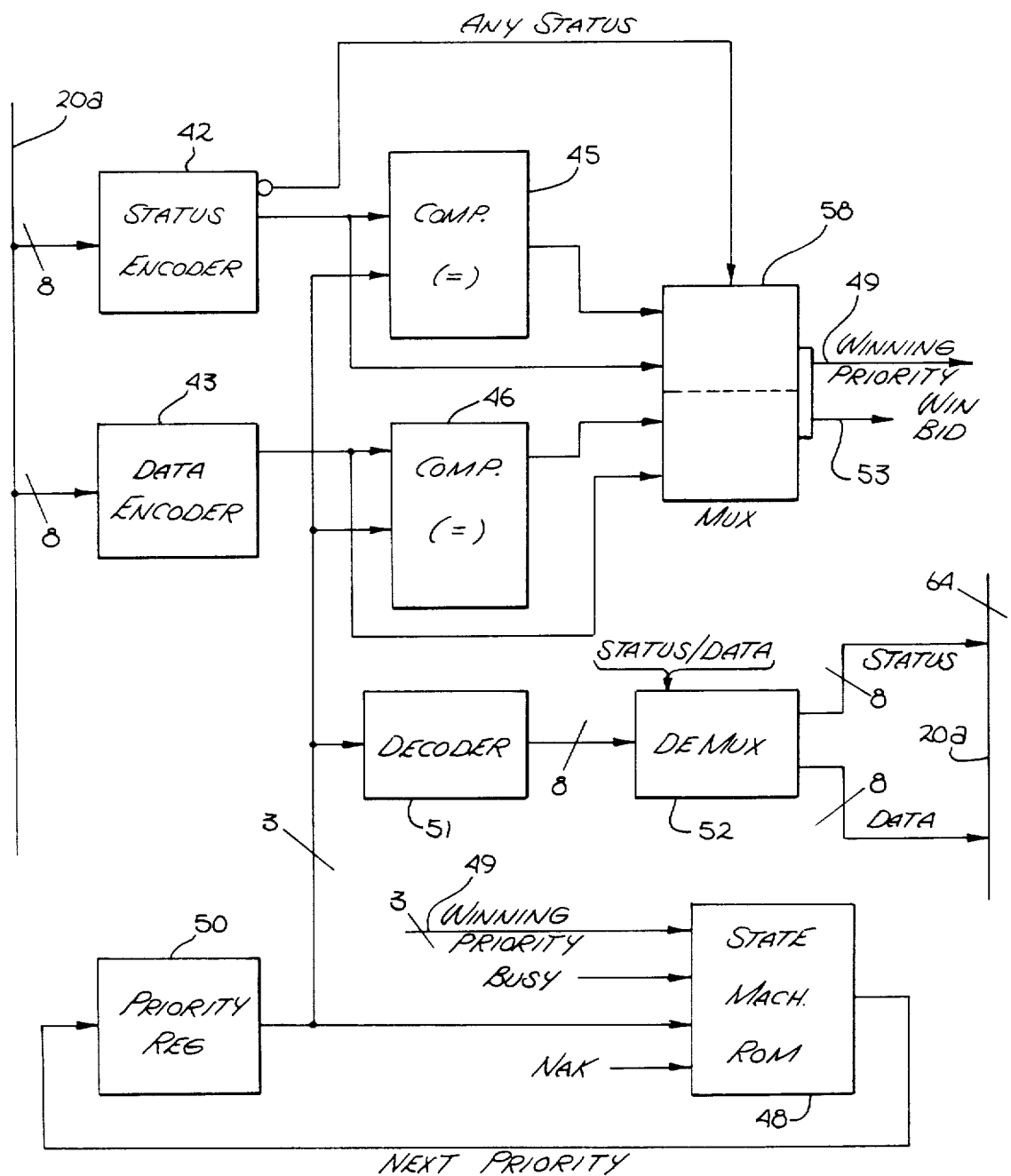
FIG. 7 is a block diagram of the circuit employed in the present invention by each node for bidding for the bus.

Each of the nodes includes circuitry which enables it to bid for the system bus. The circuitry is contained within the interface circuits in the case of the processors and in the adapter circuits, in the case of the input/output (means) ports. The arbitration mechanism is the same for all the nodes. Referring to FIG. 7, the bus bidding circuit is coupled to the 64 bus lines of the bus 20 of FIG. 1; these 64 lines are shown as lines 20a in FIG. 7. Eight of these lines are coupled to a status encoder 42 and 8 lines are coupled to a data encoder 43. The bidding circuit places its bid (priority number) on the first of these 8 lines if it is ready to transmit a status packet or on the other of the 8 lines if it is ready to transmit data.

The node's priority number is stored in the register 50 and is coupled to the decoder 51. The demultiplexer 52 couples the decoded number to either the status or data lines, depending upon whether the circuit is prepared to transmit status or data packets. The priority register 50 also couples its priority number to comparators 45 and 46. These comparators determine if the node's priority is equal to the highest priority received from the encoders. The highest status priority and data priority received by the encoders 42 and 43 are also coupled to the comparators 45 and 46. As will be described, if the bidding node wins the bid, a signal is provided on line 53. All nodes receive and examine the bidding even if they are themselves not vying for the bus. The winning priority number on line 49 in addition to the priority number from register 50 and other information is used as an address for the ROM 48 to provide the next priority number for the priority register 50. The algorithm implemented by the ROM 48 is described below.

If there are any bids to transmit status packets, this condition is sensed by encoder 42 and used to control multiplexer 58. Multiplexer 58, if there are status packets for transmission, couples the highest priority number (3 bits) from encoder 42 to lines 49 along with the win bid signal from comparator 45 to line 53 if the highest priority number matches (equals) the node's priority number. Otherwise, the highest number from encoder 43 is coupled to lines 49 and if this number is equal to the node's priority number as sensed by comparator 46 a bid win signal is coupled to line 53 from comparator 46.

Each node has a unique priority and this priority is changed by each node. On initialization, each node is assigned a different priority by circuit 30 of FIG. 1. In FIG. 8, the signals placed on the lines 20a for each possible 8 priority numbers is shown. (As the bus apparatus is presently implemented, 8 nodes are employed, however, this is arbitrary.) Note each node has only a single priority number (which is a variable) at any time. This priority number is not designated as "status" or "data" as such, but the ones of the lines 20a that this number is transmitted on, indicates whether the node is prepared to transmit status or data packets.

Referring to FIG. 4, during each bidding cycle represented by the period 40, each node which is prepared to transmit places a BUSY signal 54 on the BUSY control line and raises the potential on one of the sender identification lines (these signals are shown in FIG. 2). Each node is assigned one of the 8 sender identification lines. During this cycle, the nodes bidding for the bus transmit their priority number onto either the lines designated for the data priority or the lines designated for the status priority (see signal 56 of FIG. 4). The highest bid for status and/or data are transmitted from the lines 20a into the comparators 45 and 46 in each of the nodes, as mentioned. If a node is bidding against itself only, that is, the number in its priority register 50 is equal to the number in either comparator 45 or 46, it of course wins the bid. If there are other bidders and the number in the priority register 50 is higher than the number transmitted by the other bidders, then the node again wins the bid since the comparator receives the highest number, even if it is the number transmitted by the node itself. Thus, during each bidding cycle, the highest-priority requesting node in the chain is granted sole access to the bus. All nodes whose current priority is lower than the priority of the winning node increases its priority by one. This includes all nodes (even those not bidding). The ROM 48 makes this determination since it receives the winning priority number. The ROM of the winning node sets its priority to the lowest possible value. Any node whose current priority was higher than that of the selected node leaves its priority unchanged, again, this is done by the ROM. Physically absent nodes will quickly drift to the highest priority position in the chain, but will have no effect since they do not make requests.

Importantly, the arbitration mechanism does not lower the priority of a node just completing a status packet transmission as it would a node just completing a data packet transmission. Each circuit knows if the winning node was bidding for a status packet transmission. If it was (and won the bid) no changes are made in the priority numbers. The ROM 48 receives the status/data signal and therefore can implement this condition. Consequently, the node's ability to obtain the bus for data packet transmissions is not unfairly impaired if the node happens to be a popular destination and required to transmit status packets. To expedite the certification of already transmitted data packets, each node ignores data packets until it has dequeued and transmitted all status packets.

Thus, the priority determining mechanism for the bus is distributed among the nodes with each of the nodes determining its own priority number. With the implementation of the algorithm described above, each node will maintain a unique priority number, even though there is no central priority determining means. The above bus arbitration is particularly unique in that separate priority protocol is used for status and data packets.

BUS COLLISION AND ERROR DETECTION

During normal bus operation, the PAK signal, shown as signal 55 in FIG. 4, is present at the end of the first header word. This signal is transmitted by the receiving node and acknowledges that that node has identified itself as the receiving node and that it is receiving the packet. (This is one of the three control signals shown in FIG. 2). The transmitting node lowers the busy signal 54 one bus cycle before the end of its transmission. This is shown by waveform 57 for the case where a node is transmitting 128 data packets. The dropping of this signal alerts all the nodes to the fact that on the next bus cycle, bidding can again begin.

An error cycle is initiated for a number of conditions which indicate that a normal transmission cycle is not occurring. For instance, if the PAK signal does not rise in potential during the second header, or if the busy signal is not lowered one cycle before transmission is to cease, the NAK signal 59 of FIG. 4 is transmitted. All nodes count the number of words being transmitted during any transmission after sensing the number of words which are to be transmitted (the eight bits representing the length of information being transmitted in header 1). If more than a single node transmits at a given time (collision condition), all nodes again detect this and transmit the NAK signal. Collision is detected when more than one of the ID lines remains high during packet transmission. Other conditions, as will be discussed, cause the nodes to generate the NAK signal, and hence, initiate error cycles.

During the first error cycle, all nodes detecting the error send out an error code on the eight lines which are also used for ID signals (see FIG. 2). Seven of these lines are used to indicate a unique error as set forth in FIG. 6. For instance, the fifth line is used to indicate inconsistent length. The last line is used to indicate that the eight bits of parity did not match with the packet transmission. On the second cycle of the error sequence, these same eight lines are used to identify the nodes detecting errors. For example, if the addressed node does not have a buffer ready to receive data, it identifies itself.

The system includes a diagnostic program which takes action once the error information has been transmitted over the bus. Within circuits 30 an analysis of the detected error is made and appropriate action taken such as retransmission of data, isolation of a failed node, etc. Each node itself includes certain diagnostic routines to allow identification of problems within the node. Following the error sequence, a dead cycle occurs, and then bidding again begins.

INTERFACE CIRCUIT

Referring to FIG. 10, the interface circuit, as previously mentioned, provides the interface between the processors and the system bus. The 64 data lines of the system bus are coupled to an output register 66 and an input register 67. Data flowing to and from the system bus flows through these registers. All the data and header words flow through the lines 63 into the buffer 70. Data flowing to and from the pocessor flows through transceivers 61 and the double registers 62. (These registers permit bidirectional flow.) During the first half of each bus cycle, flow between lines 63 and the system bus occurs in the appropriate direction. Then, on the second half of each cycle, flow occurs between lines 63 and the two 64-bit buses of the processor. Therefore, data to the buffer 70 is time multiplexed over the line 63 to the system bus on one half of the bus cycle, and in the other direction to the processor on the other half of the bus cycle.

For purposes of simplification, the parity bits are not shown. Additional lines are used for the parity bits. These bits are also buffered and a parity check is made against the data during each bus cycle. The results of this parity check forms one input to the state ROM 74 on line 73.

The buffer 70 comprises static memories and has a capacity of 128k bits (plus the parity bits). It is divided into a transmit section and a receive section. The receive and transmit buffers are numbered (and dedicated) to correspond with the node addresses on the bus (i.e., 0–7). Each section stores 512 128-bit words. These sections are further subdivided into individual buffer sections of 64 words, each designated for one of the eight nodes in the system. The buffer assigned to the home processor itself is used for storage of header information. Within this header area, eight words are allocated to each of the nodes in the system. When a processor receives a packet from a node, the circuit places the header part of the incoming packet into the receive header section corresponding to that node and the data part of the packet into the corresponding receive buffer. The receive header section corresponding to the home processor is also divided into eight sections called receive status sections. Each of these sections contain a one-word status code for each of the other nodes in the system, these codes indicate the status of the last packet that was sent to the corresponding node. The buffer addressing means 60 provides buffer 70 addressing. This shall be described in conjunction with FIG. 12.

The eight transmit buffers are organized in an identical manner to the receive buffers. The transmit buffer corresponding to the home processor is divided into eight sections called transmit header sections. The transmit header sections are again numbered from 0–7 corresponding to the eight nodes on the system bus. Each section is eight words long. When a processor sends a packet to a particular node, the processor's microcode (which will be discussed later) puts the header from the outgoing packet into the transmit header section corresponding to that node and the packet data into the corresponding transmit buffer.

Figure 11:
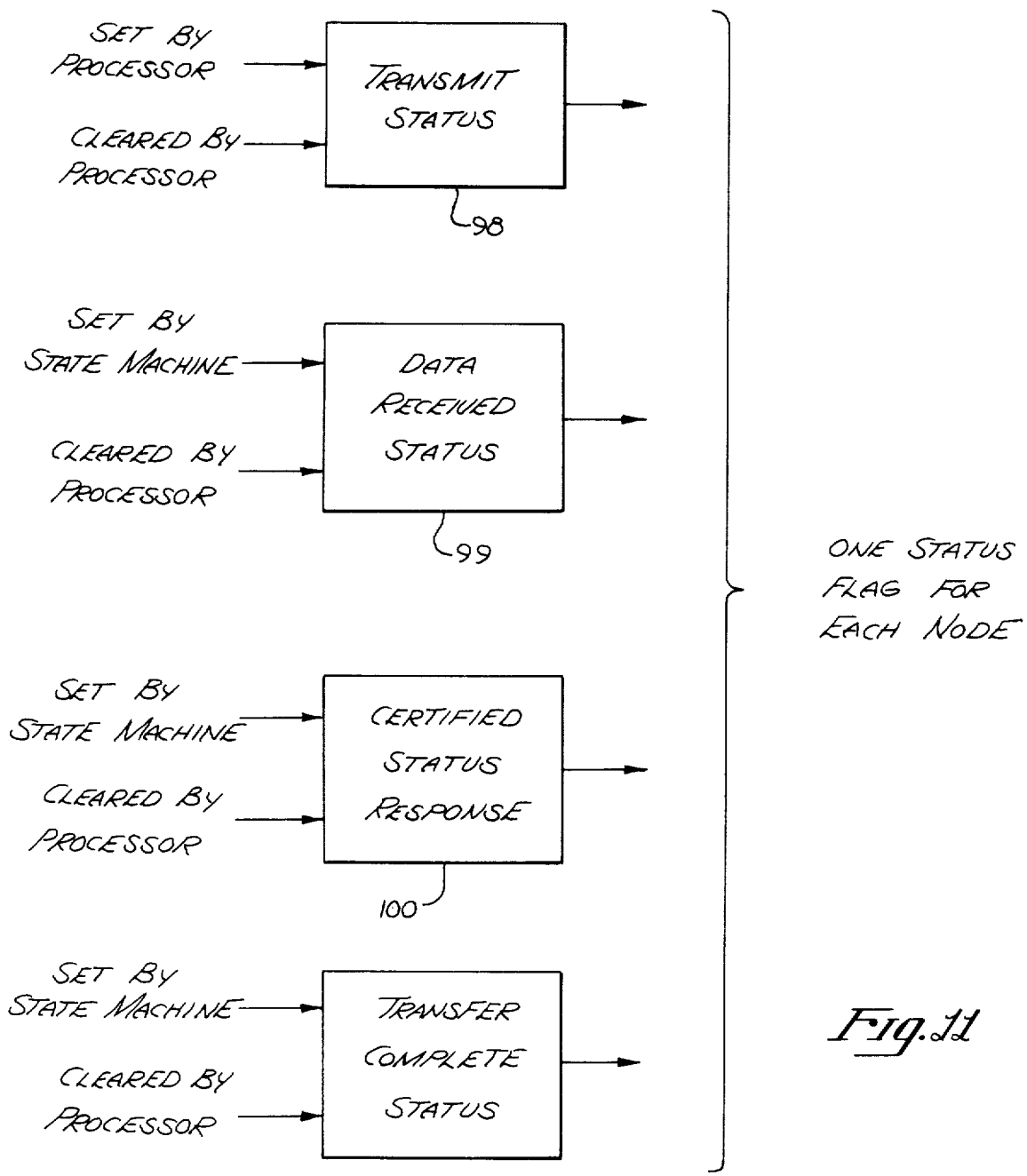
FIG. 11 illustrates status flags used in conjunction with the circuit of FIG. 10.

The state ROM 74 is an ordinary ROM used as part of a state machine, as is commonly done for controllers. (A single ROM 74 is shown, in practice ROM 74 comprises four 512 words × 8bits and one 32words × 8bits.) It receives several inputs which act as addresses and provides the appropriate output to drive the interface circuit of FIG. 10. The output of the state ROM 74 is loaded into a state register 75 and the state of the various bits in the register 75 control the interface circuit, as will be described. The state ROM receives the results of the bus arbitration, that is, the bid win signal. (This was discussed in conjunction with FIG. 7 and is shown simply as block 77 of FIG. 10.) The NAK, PAK and busy control signals previously described, also form inputs to the state ROM. There are a number of status flags which provide the status of transfers. These also form inputs on lines 79 to the state ROM 74. These flags will be discussed in conjunction with FIG. 11. The current state from the state register 75 forms an input on lines 82 to the ROM 74 as is commonly done in state machines. The ROM 74 also receives inputs from the microinstruction register 88.

The processor includes microcoding which is distributed to several boards, in the processor and also to the interface circuit. (See copending Application Ser. No. 624,142 filed June 25, 1984, now abandoned, entitled Distributed Microcode Address Apparatus for a Computer and assigned to the assignee of the present invention for a discussion of the microcode address bus.) The microaddress bus 85 (14 lines) from the processor is coupled to the writable control store 84 and provides an address to seek microinstructions from store 84. The microinstruction register 88 provides a write signal to the buffer 70 on lines 89 and inputs to the state ROM 74 on lines 90. While not pertinent to the present invention, the output of the register 88 also controls the error correcting code mechanism. (The write signal is time multiplexed through multiplexer 72. The clocking signal for the multiplexer 72 is the same bus cycle signal used to control signal flow through lines 63.)

The store 84 is loaded on initialization. In practice this memory receives the addresses from bus 85 through a multiplexer. During diagnostics, special addresses are used for testing which are not necessary to the present invention.

The output of the state register controls the arbitration, as shown by line 94, provides signals to the status flags on lines 95, provides signals to the addressing means 60 on line 96, and provides controls for the buffer 70 on line 97.

Before discussing the operation of the circuit of FIG. 10, it is helpful to understand the control mechanism between the processor and the interface circuit. This consists of the status flags 98, 99, 100 and 101 shown in FIG. 1. As previously indicated, the buffer 70 of FIG. 10, includes receive and transmit buffers dedicated to each of the other nodes on the bus. That is, data from node 3 will always be received in the same predetermined buffers within node 7. Likewise, each of the status flags 98 through 101 include a flag dedicated to each of the other nodes in the system. In effect, there are eight sets of status flags on each of the interface circuits and each set of flags is dedicated to a node on the bus. The status flags can be accessed by either the processor or the interface circuit. The transmit status flag 98 indicates that the transmit buffer for the corresponding node is not empty, or that a status response has not yet been received for the last packet sent. This flag is set by the processor and is also cleared by the processor. The data receive status flag 99 indicates that the receive buffer for the node is not empty. This flat is set by the state machine, but cleared by the processor. The certified status response flag 100 indicates that a status message was received from a node. It is set by the state machine and cleared by the processor. The last flag 101, the transfer complete status flag, indicates that a request data transmission (either data or status) has been completed. It is set by the state machine and cleared by the processor. These flags provide a running account of buffer status and thus determine when a buffer may be used or should not be used. It also provides a running account of whether status messages have been accepted and examined.

Figure 12:
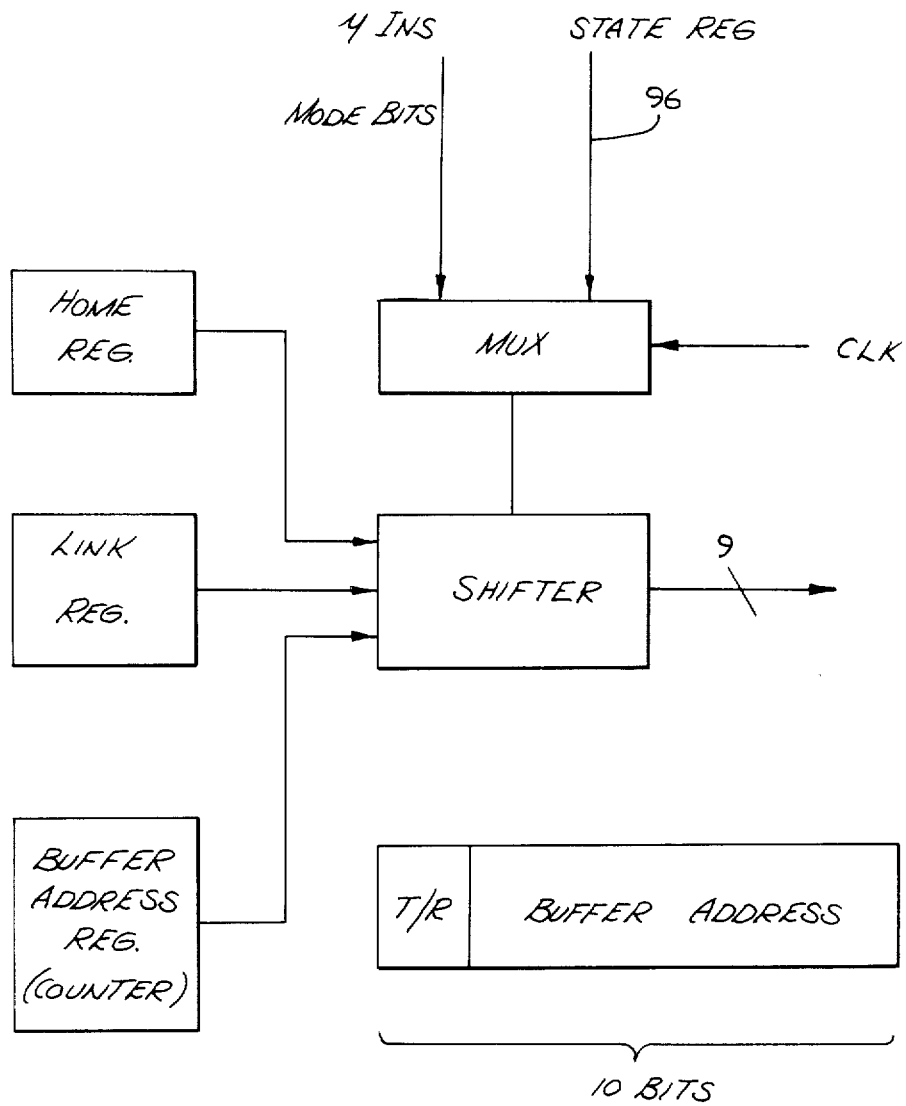
FIG. 12 is a block diagram of the addressing means used to address the buffer of FIG. 10.

In FIG. 12, the buffer addressing means 60 of FIG. 10 is shown in detail. The buffer address (9 bits of it) is coupled to the buffer 70 of FIG. 10 on lines 114. A tenth bit, shown as bit 116 in FIG. 12, originates from the microinstruction register 88. This bit determines whether the buffer locations addressed by the remaining 9 bits are either transmit or receive sections. For each bus cycle, two different addresses are necessary because, as mentioned in conjunction with FIG. 10, data flows from the system bus on half the cycle, and data from the processor bus on the other half cycle to permit the time multiplexing over lines 63. The clock signal to the multiplexer 110 provides this change in addressing for each half cycle. The multiplexer 110 either selects the mode bits on lines 111 from the instruction register 88 of FIG. 10, or the bits on lines 96 from the state register 75. The signals from the multiplexer 110 to the shifter 112 determine whether signals from the registers 106, 107 and 108 will be present in the output address on lines 114 and also the order of these signals.

The home register 106 stores a number corresponding to the mode's own identification number. This number is static and is set upon initialization. The link register 107 contains the number of the buffer node which is to receive/transmit. This number is set by the processor. The buffer address register 108 operates as a counter to provide sequencing of the address signals, for instance, when 64 words are to be transmitted or received, this register provides counting to increment the address.

The 10 bit address illustrated in FIG. 12 for the buffer 70 thus consists of 9 bits transmitted on lines 114 and a tenth bit that transmits/receive bit 116. And, as mentioned, these bits are arranged depending upon the mode of addressing, that is, whether it is direct, data, status, or header. The header words themselves originate in the processor and are transferred via lines 63 to and from the buffer 70 on the system bus 20.

During a normal transfer, first the sending processor loads the header and packet information into the transmit buffer for a designated node. The header and data are sent to the corresponding receive buffer of the receiving processor. A status response is sent back to the sending node indicating the disposition of the packet. When a processor (sending processor) sends a packet to another processor (receiving processor), the microcode directs loading into the transmit header and data section corresponding to the receiving node, then sets the appropriate transmit/active bit that corresponds to the receiving node at the state ROM. The transfer then occurs to the predetermined receiving buffer of the receiving node and sets the receive data flag. Upon completion of a transfer (data or status), the transmit complete status flag is cleared by the processor when the processor has examined the packet.

INPUT/OUTPUT ADAPTER CIRCUIT

A. Overview of Adapter Circuit

The adapter circuits such as circuits 27 and 28 of FIG. 1, as mentioned, provide an interface between the system bus 20 and the input/output subsystems. In the presently preferred embodiment the subsystems are for input/output functions and consequently, serve the processors coupled to the bus 20. Their organization is somewhat different than that of the interface circuits because of this role. One specific difference is that the buffers in the adapters are not dedicated to receiving data from any particular node, that is, they are dynamically allocated based on need. This is done since large amounts of data flow may be required between a particular input/output subsystem and a processor. As presently implemented, any of the input/output subsystems can receive and transmit data to any of the processors. Because of the dynamic allocation of buffer space, the buffer addressing is more complicated than in the case of the interface circuits.

Figure 13:
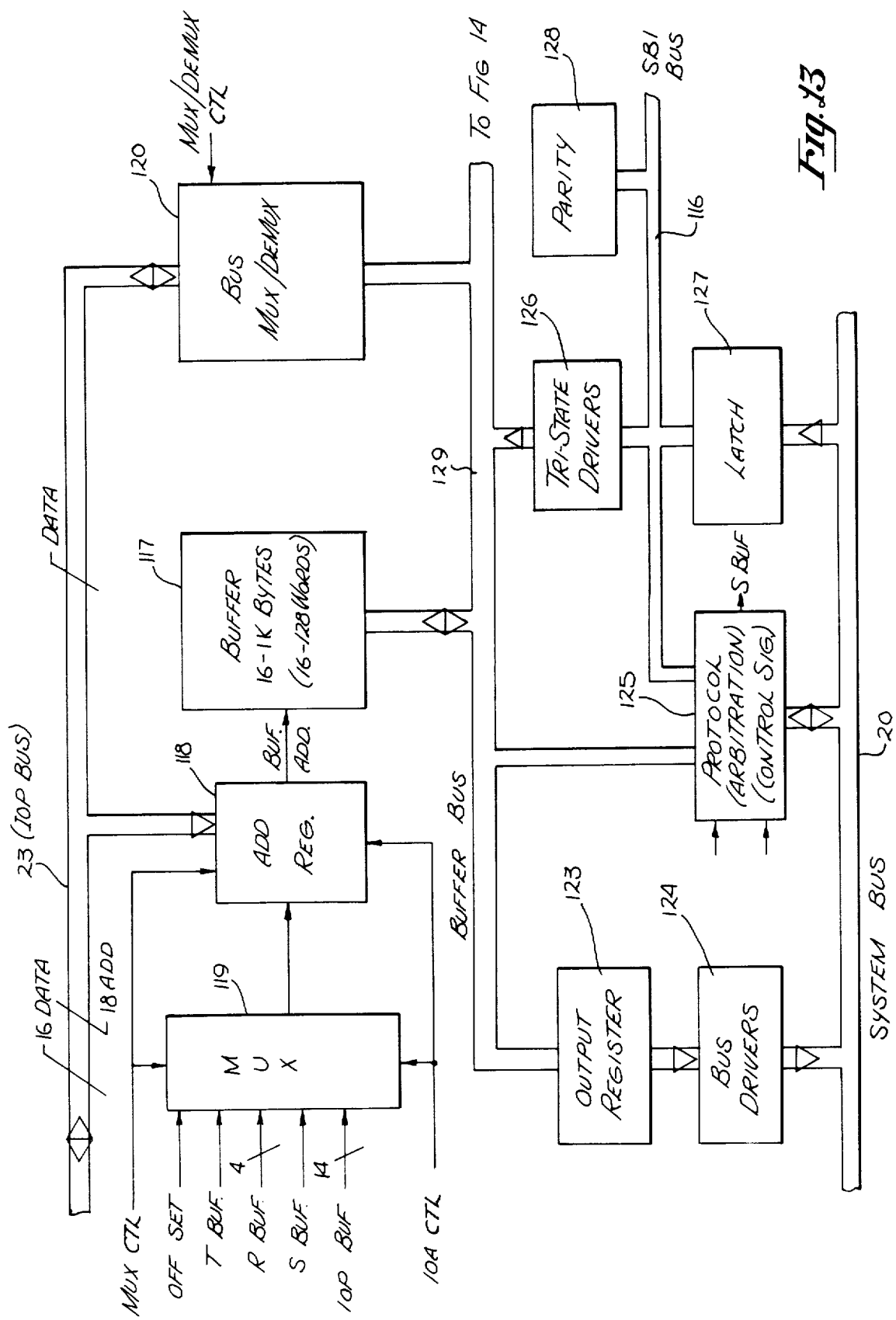
FIG. 13 is a partial block diagram of the adapter circuit of FIG. 1.

As shown in FIG. 13, the adapter circuit communicates with the input/output subsystem or processor (IOP) bus 23 which in the presently preferred embodiment is coupled to a Unibus through a standard interface circuit. The IOP bus has 18 address lines and 16 data lines. The data lines are coupled to a bus multiplexer/demultiplexer 120, and the address lines are coupled to the address register 118 and multiplexer 119.

Input data from the system bus 20 is coupled to a latch 127 then to tristate drivers 126 for coupling onto the bidirectional buffer bus 129. Output data for the system bus is coupled to an output register 123, then to the bus drivers 124 and onto the system bus 20. A protocol unit 125 is also coupled to the system bus 20. This unit performs the arbitration previously discussed, generates the control system bus signals previously discussed, and performs other functions which will be described. The unit 125 also receives signals from the SBI bus 116.

All data transferred into and from the processor (IOP) flows through the buffer 117. This buffer is addressed through the address register 118 which register is used for pipelining the addresses. The addresses are selected by the multiplexer 119 from a plurality of signals which will be described. The buffer 117 has a capacity of 16×1k bytes, or 16×128 64-bit words. The buffer is divided into sixteen sections, buffer section 0 to buffer section 15. Buffer section 0 is used for storing status and header packets. It is divided into fifteen subsections, each of which is associated with (i.e., dedicated to) one of the remaining buffer sections. That is, buffer section 12 which can store 128 words of data has allocated space in buffer section 0 for the storage of a two word header and two words of status. When a transmission is received and assigned to buffer section 12, the header packets of the transmission are stored in the allocated subsection of buffer section 0. Status packets associated with the data in buffer section 12 are likewise stored in the allocated subsection of buffer section 0.

One half of each bus cycle is used for communication between the buffer 117 and the IOP while the other half of each bus cycle is used for communication between the buffer 17 and system bus. The multiplexer control signals coupled to multiplexer 119 and the address register 118 controls this cycling. These signals are generated by the state machine 134 of FIG. 14. There are numerous other control signals from the state machine of FIG. 14 used to control flow of data through the registers, drivers and latches associated with the system bus which are standard timing signals and hence not shown.

When the IOP is addressing the buffer, the buffer space appears to the computer as being part of the computer's main memory. Octal addresses 400000 through 577777 are used for this purpose. The data flow from the buffer over the IOP bus 23 is handled in a direct memory access (DMA) mode from, for instance, the buffer 117 onto a disk, or vice versa. The PDP 11 used in the subsystem primarily does management functions, and is not used for computations.

Portions of the adapter circuit not needed for an understanding of the present invention are not illustrated. For instance, those portions used for diagnostics, certain control and timing signals, parity bit manipulations and others, are not illustrated. However, a parity checking circuit 128 is illustrated in FIG. 13 coupled to the SBI bus 116.

In general, data flow from the bus 20 into the buffer 117 occurs through the latch 127, drivers 126, bus 129 into the buffer 117 on half the bus cycle. On the other half of the bus cycle the data flows from the buffer 117 onto the bus 129 through the multiplexer/demultiplexer 120 and then onto the IOP bus 23. Since the IOP bus 23 is a 16-bit bus, and bus 129 a 64-bit bus, the multiplexer/demultiplexer sequentially selects 16 lines of the buffer bus 129 for transmission on the bus 23. In the other direction, data flows from bus 23 through the multiplexer/demultiplexer 120 onto bus 129 and then into the buffer 117. Similarly, 16 bits at a time are sequentially taken from bus 23 and placed on the buffer bus 129.

Figure 15:
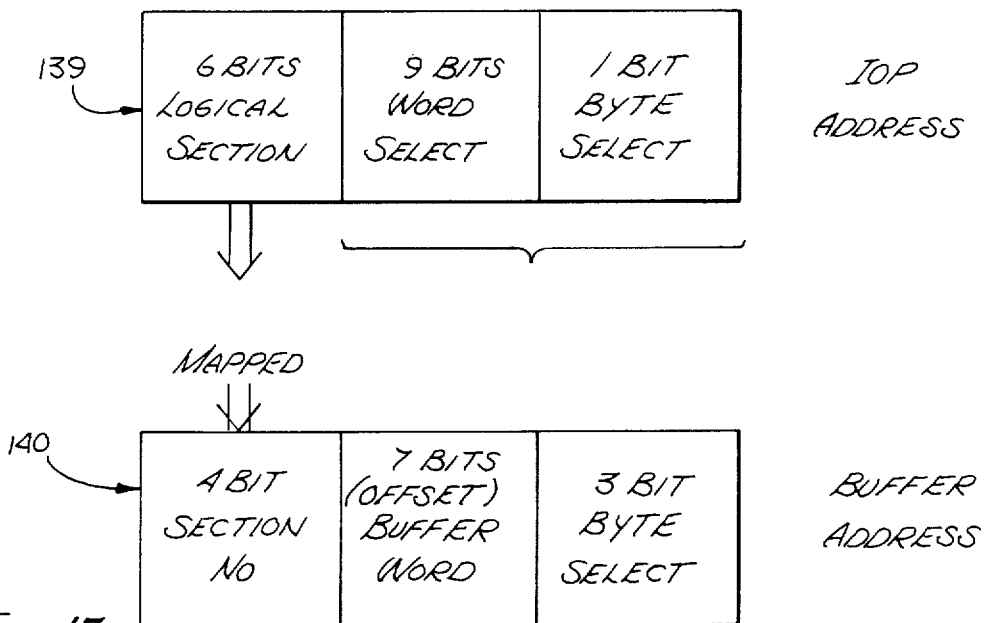
FIG. 15 is a chart used to describe the addressing of the buffer of FIG. 13.

As shown in FIG. 15, the buffer 117 is addressed by a 11-bit address 140. Four of the bits define the buffer section and 7 bits are used for accessing each of the 128 word locations in each buffer section. Three additional bits are also used. Two of these bits control the selections of the four 16-bit fields of the buffer bus 129 for the 16-bit bus 23. The last bit controls byte selection.

The IOP address 139 includes two additional bits; 6 bits are used for a logical buffer section address. These 6 bits are coupled to a mapping RAM which provides an output 4-bit physical buffer section number which is actually used for addressing the buffer 17. This mapping is used to make any discontiguous sections appear contiguous in the IOP address space. This allows data from several buffer sections to be transferred to or from, for instance, a disk in a single DMA transaction.

The byte ordering convention used by the IOP is opposite to that used by processors 21 and 22 of FIG. 2. Some means must be provided to swap bits, for instance, from the multiplexer/demultiplexer 120. While the IOP itself can do this, its performance is unacceptably low. An additional bit from the mapping RAM coupled to the multiplexer/demultiplexer 120 controls this swapping. This again is not critical to the present invention, but rather, results from the different conventions used by the IOP and the processors 21 and 22.

Figure 14:
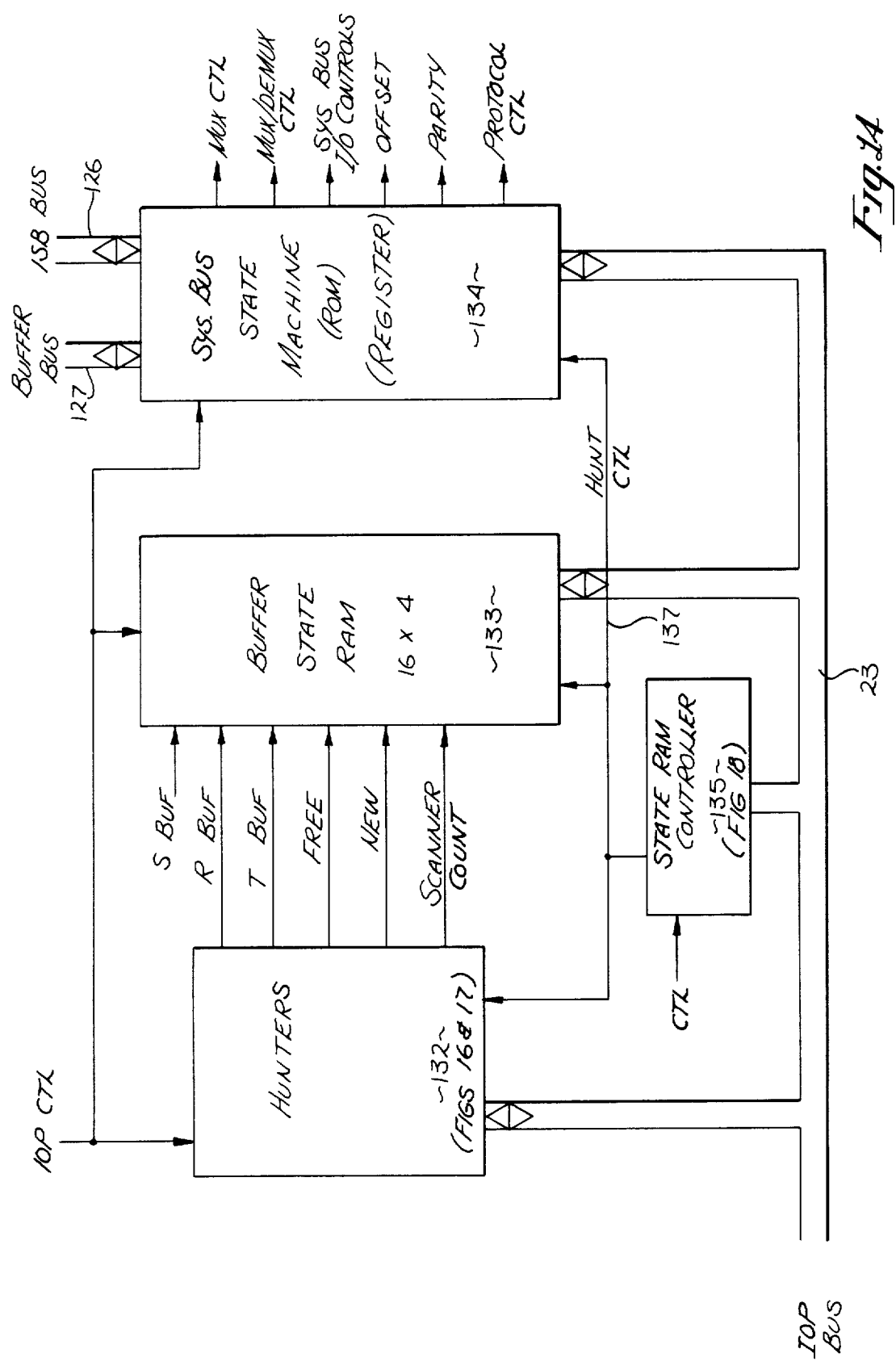
FIG. 14 is a block diagram of the remainder of the adapter circuit of FIG. 1.

In FIG. 14, the IOP bus 23 is shown connected to the hunters 132, buffer state RAM 133, system bus state machine 134 and the state RAM controller 135. The buffer bus 129 and SBI bus 116 are also coupled to the state machine 134.

The hunters 132 comprises a counter, four state machines and a plurality of registers. The state machines and registers will be described in detail in conjunction with FIGS. 16 and 17. In general, however, the hunters identify available buffer sections by scanning the buffer state RAM 133. The RAM 133 contains the status of each of the buffer sections in the buffer 117. Thus, for instance, when data is to be received, a hunter identifies an available buffer section (buffer section 1 to 15) and provides a receive buffer address (RBUF) to the multiplexer 119. And after the buffer section has been loaded, other notations are made in buffer state RAM 133 to indicate the new status of the buffer section.

System bus state machine 134 controls the transmission and reception operations to/from the system bus. For example, it control address multiplexing from multiplexer 119 during one half of each bus cycle. The transmit (X) hunter when in a valid state (as will be discussed in conjunction with FIG. 16) triggers state machine 134. Similarly, an incoming system bus transfer with the receive (R) hunter in a valid state triggers the state machine 134. The state machine 134 is similar to other commonly used state machines such as the one described previously in this application. It primarily consists of a state register and read-only memory. Some control signals provided by this state machine will be discussed in connection with ROM 181 of FIG. 18. Other signals provided by machine 134 are the multiplexer/demultiplexer control signal, offset counting for the multiplexer 119 to provide the buffer word count (7 bits), control signal for multiplexer 119, parity status checks, and control signals for the protocol unit 125 of FIG. 13.

The buffer state RAM controller 135 controls the state changes in the RAM 133 and hunters 132. It receives control signals from the state machine 134, IOP bus 23 and from the hunters 132. The controller uses three pairs of ROMs which are described in conjunction with FIG. 18 for changing the contents of the RAM 133 and for changing the states of the hunters 132. Additionally, the controller 135 includes two state machines. One of these machines is used for system bus requests from the state machine 134 and, for instance, selects addresses to be used for transfers to the system bus. (The state machine 134 itself does not contain any buffer address information.) The second state machine within controller 135 controls the hunters' access to the RAM 133 and also the IOP's access to this RAM. It also performs an arbitration function that arbitrates between the hunters' access and IOP's access to the RAM 133. IOP's access overrides the hunter's access since IOP's access is less frequent. The operation of the two state machines within controller 135 are interlaced, each having access to the RAM for one half a bus cycle. Two bus cycles are required to complete a transaction since a read and write operation for the RAM 133 is necessary. The operation of the controller 135 will become better understood when the flow diagram of FIG. 19 is described.

For purposes of understanding the adapter circuit, the specific buffer states stored within the RAM 113 should be understood. In the following listing, BUFx refers to one of the 15 buffer sections, HEADx its associated header space in buffer 0, and STATx its associated status space in buffer 0. In the listing below, BUFx, HEADx, and STATx are referred to as "triplets".

TABLE

| Name | Code (hex) | Definition |
|---|---|---|
| FREE | 0 | BUFx, HEADx, and STATx contain unneeded data, and may be allocated for transmission or reception |
| LOADING | 1 | The IOP is loading BUFx and HEADx with a data packet to be transmitted |
| XMIT | 2 | The data packet in BUFx and HEADx is ready to transmit; if transmission is successful, the triplet will be returned to the FREE state |
| XMIT_WAIT | 3 | The data packet in BUFx and HEADx is ready to transmit; if transmission is successful, the triplet will be advanced to the UNACKED state to await acknowledgement |
| UNACKED | 4 | The data packet in BUFx and HEADx has been transmitted; a status packet is expected |
| ACKED | 5 | The data packet in BUFx and HEADx has been transmitted; STATx contains a status packet received in response (generates IOP NEW_STATUS_PACKET interrupt) |
| XMIT_HOLD | 6 | The IOP has been informed that STATx contains a status packet received in response to the data packet in BUFx and HEADx but has not freed the triplet |
| RECEIVING | 8 | BUFx and HEADx have been reserved to store the next incoming data packet |
| LATENT | 9 | An incoming data packet has been received without error and stored in BUFx and HEADx (Generates IOP NEW_DATA_PACKET interrupt) |
| NOSTAT | A | The IOP has been informed of the |

TABLE-continued

| Name | Code (hex) | Definition |
|---|---|---|
| | | incoming packet in BUFx and HEADx but has yet to either fabricate a status packet in STATx or free the triplet |
| STAT | B | STATx contains a status packet to be transmitted in response to the packet in BUFx and HEADx |
| RCV_HOLD | C | The status packet in STATx has been transmitted (generates the IOP STATUS-SENT interrupt) |
| XMIT_ERR | 7 | An error occurred while transmitting the packet in BUFx and HEADx (generates the IOP XMIT_ERROR interrupt). Error information is available in an XMIT_ERROR status register. Further transmission by this node is inhibited until the IOP issues the RESUME_XMIT command. |
| EMPTY | D | BUFx/HEADx are available for service as a transmit buffer (Generates the IOP NEW_EMPTY_BUFFER interrupt) |

Initially, all of the bits in the RAM 133 are set to a predetermined condition, for instance, all zeros to indicate that all buffer sections are FREE.

B. HUNTERS

The adapter circuit has four hunters, each of which includes a 4-bit state machine and register. One hunter is referred to as the receive hunter. This hunter searches through the RAM 133, as will be described and identifies buffer sections which are FREE. These buffer sections are used for receiving data from the system bus. Upon determining that a buffer section is FREE, as will be described, the controller 135 changes the state for the buffer section to RECEIVING. The buffer section number (RBUF) is used by multiplexer 119 for addressing the buffer 117.

The transmit (X) hunter examines the RAM 133 to identify buffer sections which are ready to transmit data. Once a buffer section is identified, its address (TBUF) is used by the multiplexer 119 to address the buffer 117. This is shown in the above table as the XMIT state, XMIT WAIT state or STAT state.

The new (N) hunter scans the buffer state RAM 133 looking for buffers in one of the following states: LATENT, XMIT HOLD, XMIT ERR OR RCV HOLD. In general, these are states which require IOP action, such as the transfer of data from a buffer section to the IOP.

The fourth hunter, EMPTY (E) hunter scans RAM 133 to locate FREE buffer sections into which data may be loaded from the IOP. As will be seen, once the IOP is loading data into the identified empty buffer section, the "LOADING" state is noted in the RAM 133. Both the receive hunter and empty hunter, as described above, search for FREE buffer sections. The receive hunter has priority over the empty hunter since first priority is given to accepting data from the system bus to free it for use by the other nodes.

Figure 16:
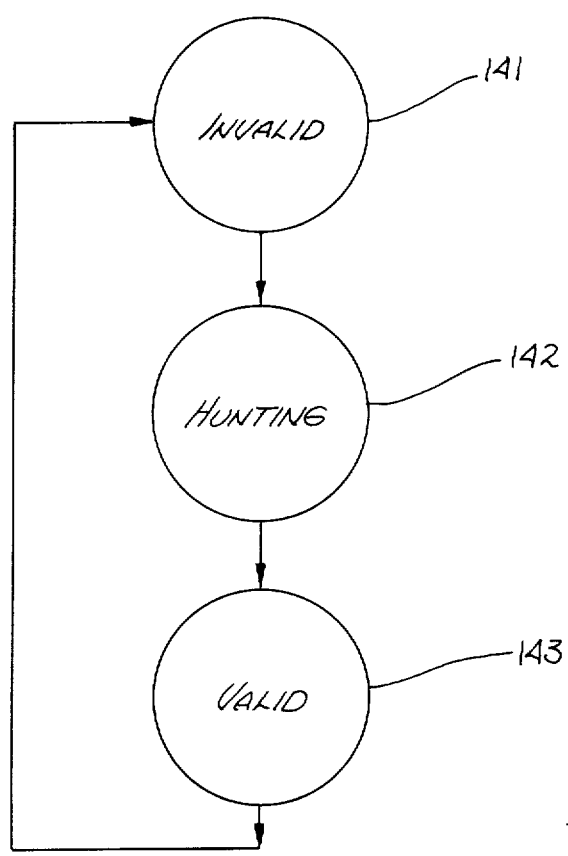
FIG. 16 illustrates status of state machines which are part of the hunters of FIG. 14.

The state machines for hunters are shown each having three states, 141, 142, 143 and 144 in FIG. 16. Initially, all four hunters are set to invalid (state 141) at the time hunting begins. The receive and empty hunters immediately proceed to the hunting state 142. The new and transmit hunter require a "compare" signal (discussed below) before making the transition to the hunting state. When a match occurs, that is, when a hunter locates what it is looking for, the hunter changes to the valid state 143. Until invalidation occurs, the hunter remain in the valid state 143. The generation of the "match" signals for the hunters and the invalidation signals will be described in conjunction with Figure 18.

Figure 17:
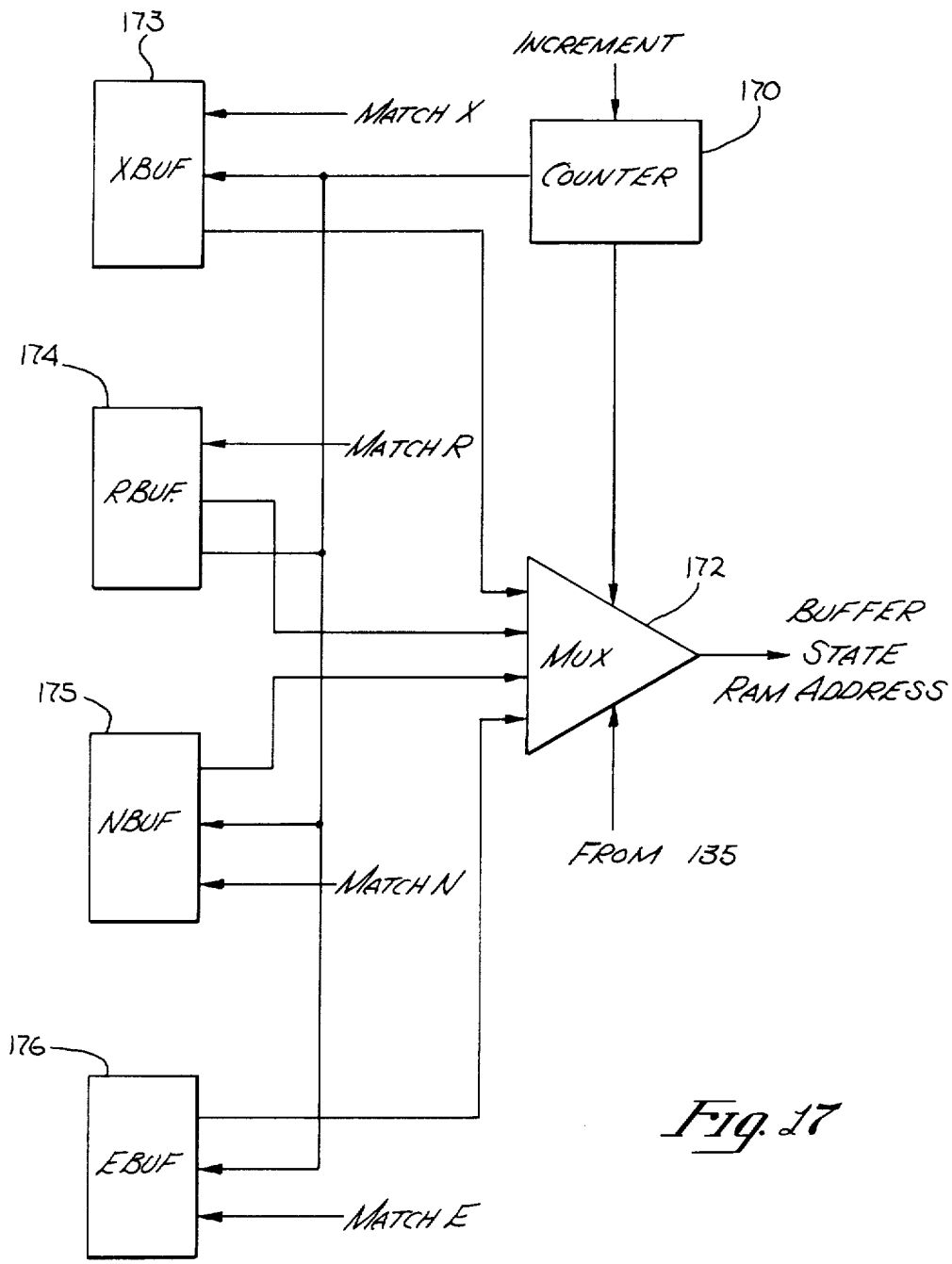
FIG. 17 illustrates a portion of the hunters of FIG. 14.

Before either the new or transmit hunters begins hunting, the count in the scanner 170 of FIG. 17 must match the count in NBUF or XBUF, respectively. (Ordinary comparators, not shown, are used for this purpose.) In effect, this requires hunting to begin at the point where it was last stopped for these two hunters. This prevents the new hunter or transmit hunter from remaining in shortened scan loops within RAM 133 causes scanning of less than the entire RAM 133. These loops could prevent the new hunter or transmit hunter from identifying buffer section requiring service. The same consideration does not apply for the receive or empty hunters, that is, any free buffer is suitable to receive data, there being no disadvantage in reusing the same buffer before exercising other buffers.

In FIG. 17, the addressing for the buffer state RAM is shown for the hunters' access. (The IOP bus accesses the buffer state RAM 133 and as will be described in conjunction with FIG. 18 with addresses from the IOP bus.) A 4-bit counter 170 provides the counts to scan through the 16 locations of the buffer state RAM 133. This counter is incremented by a signal from ROM 180 of FIG. 18. The count from the counter 170 is coupled through the multiplexer 172 and provides addresses for the RAM. This count is also coupled to four registers identified as the XBUF 173, RBUF 174, NBUF 175 and EBUF 176. These registers are associated with the four state machines of FIG. 16, specifically the transmit hunter, receive hunter, new hunter and empty hunter state machines, respectively.

Assume, for sake of discussion, that the receive hunter is in its hunting state 142 of FIG. 16. The counter causes the buffer state memory to be scanned and each location in the memory is examined to determine if the corresponding buffer section is FREE. This is done by ROM 180 of FIG. 18, as will be described. When a FREE buffer section is found, the match R signal coupled to the register 174 causes this register to retain the count of counter 170. This count provides the receive buffer address (RBUF) for the multiplexer 119, allowing the state machine 134 to select this available register for loading from the system bus. Similarly, the other hunters record the count from the counter 170 when a match occurs, satisfying a condition which they are searching for. The counts (addresses) stored in these registers are used through the multiplexer 172 to select the 16 locations in the RAM for updating the status of a buffer section as will be more apparent from Figure 18.

C. BUFFER STATE RAM CONTROLLER

Figure 18:
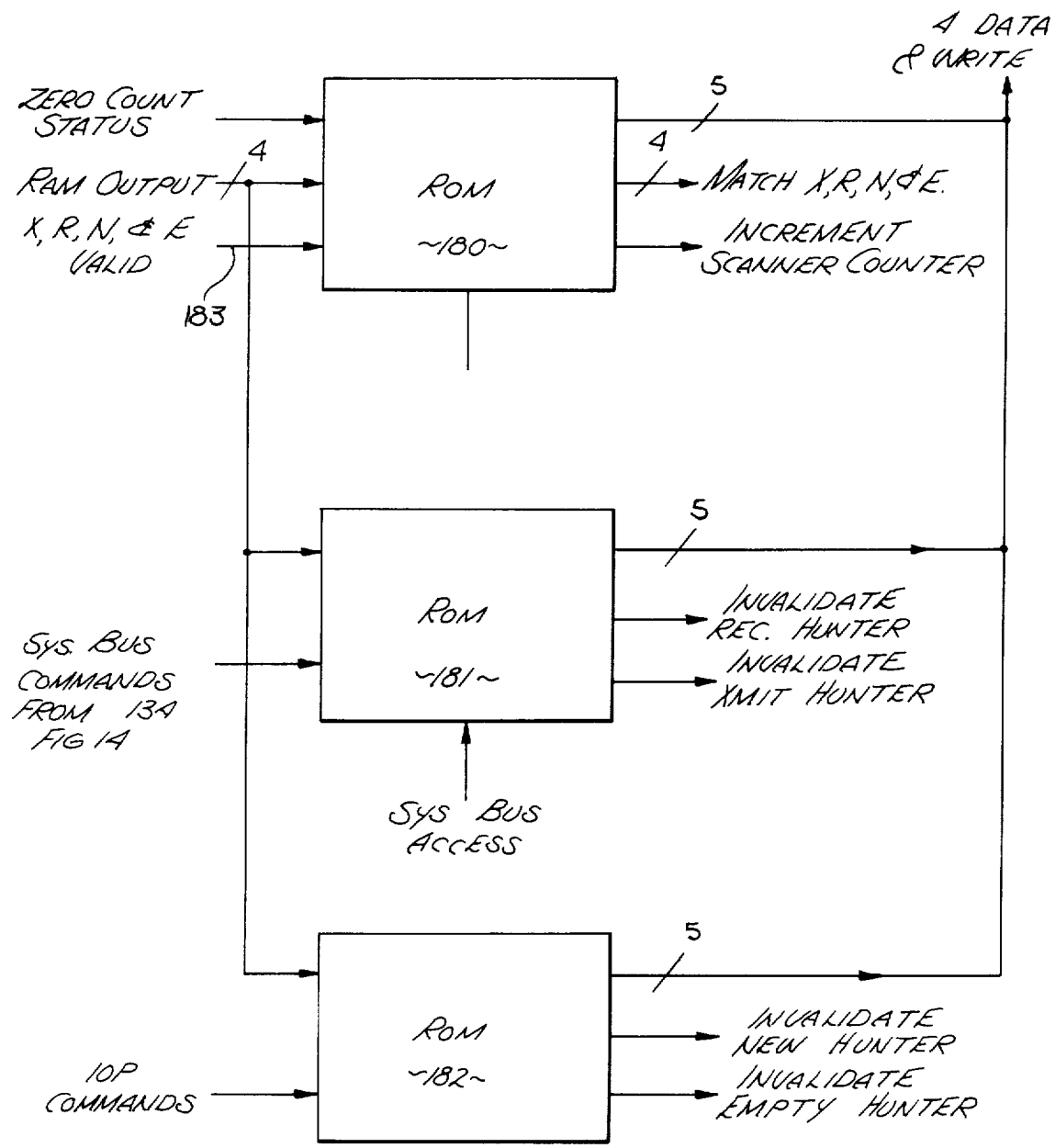
FIG. 18 illustrates a plurality of ROMs which are part of the buffer state RAM controller of FIG. 14.
Figure 19:
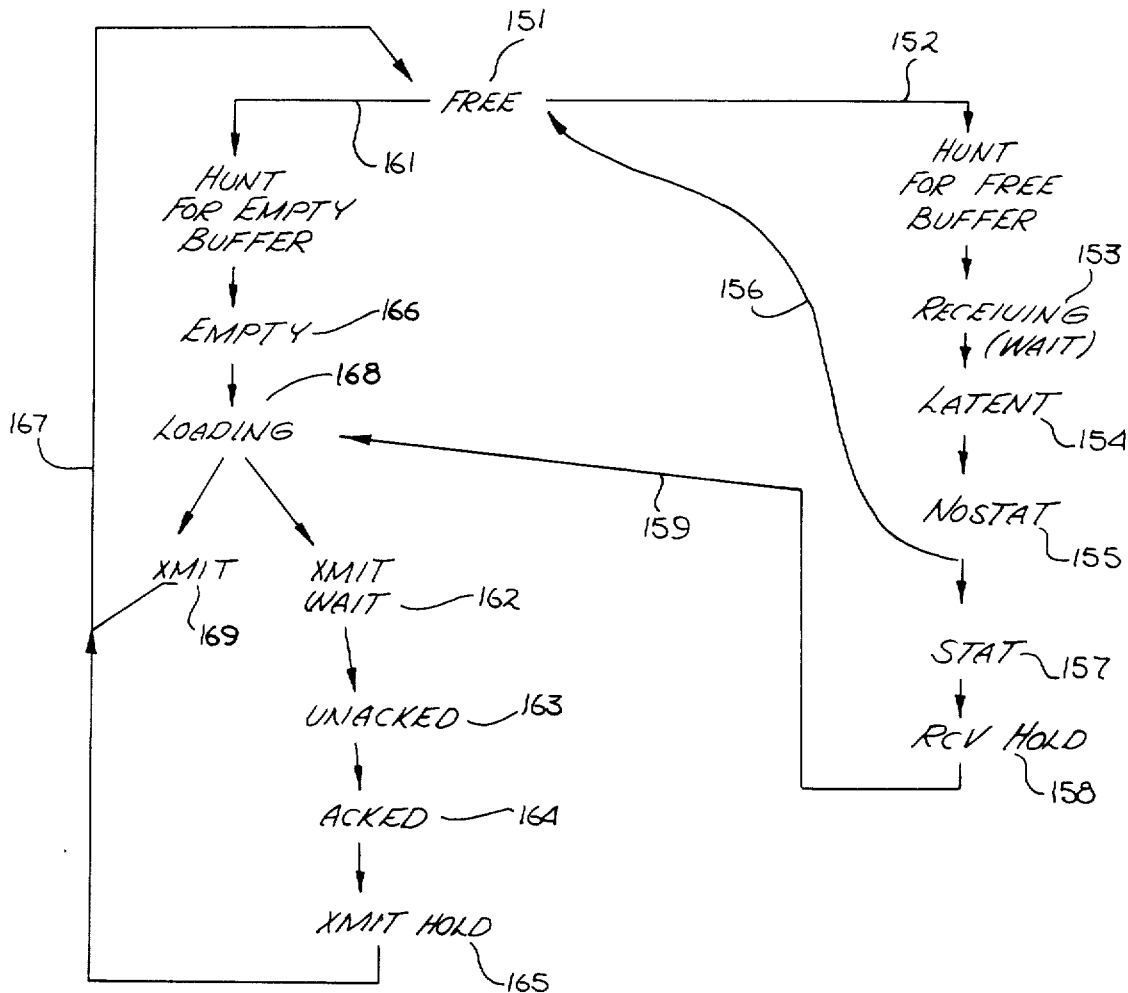
FIG. 19 is a flow diagram used to describe the operation of the adapter circuit of FIGS. 13 and 14.

As shown in FIG. 18, three ROMs, 180, 181, and 182 are used within the buffer state RAM controller. (In the current implementation, each of these ROMs is realized as a pair of ROMs.) The ROM 180 examines each of the 4-bit words from the RAM 133 and determines if a match occurs. Any combination of the hunters may be searching at any given time. Signals on lines 183 inform the ROM 180 which ones of the hunters are hunting. These signals are obtained directly from the hunter state machines of FIG. 16. Assume that the receive hunter is hunting and the data coupled to the ROM 180 from the RAM 133 indicates that a buffer section is FREE, a match signal is provided at the output of the ROM 180 to the register 174 of FIG. 17 so that the register records the current count. The ROM 180 provides a 4-bit data output word and write control signal to the RAM 133 to change the currently accessed RAM location from FREE to RECEIVING. Also, the ROM 180 increments the counter. In a similar manner, when a match occurs for the transmit hunter, new hunter or empty hunter, a match signal is provided to the registers of FIG. 17 and the state stored in the RAM 133 is updated to indicate, for instance, that an empty register has been located to receive data from the IOP bus. The purpose of the 3rd count status signal applied to the ROM 180 will be discussed later.

When the state machine 134 transfers data or status packets to or from the system bus (by selecting an address through the multiplexer 119) it provides a signal to ROM 181 to indicate that a successful transfer has occurred or that it has been unable to complete a transfer. If a transfer has occurred, the ROM 181 changes the status of the buffer section in the state RAM and additionally invalidates the receive hunter if data has been received or the transmit hunter if data has been transmitted onto the system bus.

The ROM 182 receives IOP commands to examine or modify the contents of RAM 133, to initiate transmissions of the status or data packets residing in a specified buffer section, to acknowledge its awareness of a newly received status or data packet, and to resume transmissions after a transmission error. The IOP bus provides an address to the RAM 133 over the IOP bus. The ROM 182 may update the buffer section's status in the state RAM 133, when, for example, the command alters that buffer section's state, and may also invalidate the new hunter or the empty hunter, depending upon the command.

D. "FAIRNESS" CONTROL

As previously discussed, certain measures have been taken to assure fair access to the system bus. After a data transmission has occurred, it is important that status packets be given priority so that the transmitting node can, for instance, free buffer sections which retain data until an acknowledgement occurs. It is thus important that the status packets be given priority over data transmissions.

The controller 135 maintains a count of the number of status packets which need to be transmitted. Each time the IOP issues a transmit status command, ROM 182 is used to increment the count. After each status packet transmission, this count is decremented by ROM 181. Until the count is zero, ROM 180 prohibits the transmit hunter from finding matches for data transmission, restricting it to status packet transmissions. Therefore, by way of example, the ROM 180 only issue a transmit match if the buffer section being scanned was in the STAT state. When the count is zero, indicating that all status packets have been transmitted, the signal to ROM 180 allows all the matches to take place.

E. OFFSET COUNTING

The state machine 135 provides offset addresses for the buffer 117 through the multiplexer 119. As presently implemented, two counters are used for counting of data. One provides the offset counting and the other is used to check the length of data transfers. The offset counter is initially set at −2, and then begins providing the 7-bit offset address when it reaches a count of zero. This counter provides the offset address within each of the buffer sections. By starting the counter at −2, the lower order bits can be used to differentiate the two header words. The second counter is set to the number of words which are to be transmitted or received (the header contains this information). The contents of this counter are examined, along with the busy signal to determine if the proper number of words have been received and if not, an error cycle is initiated.

F. FLOW DIAGRAM OF FIG. 19

The flow diagram of FIG. 19 illustrates typical control flow as represented by the various states stored within the buffer state RAM 133. The states are changed primarily under the control of controller 135 as discussed.

Initially the buffers are in a FREE state as indicated by state 151; this state is stored in the state RAM 133. At this point, the receive hunter is in an invalid state and hunting occurs as indicated by line 152 to locate a free buffer section. The ROM 180 determines when a match occurs and writes the RECEIVING state into RAM 133 as indicated by state 153. If a valid data is received, the buffer section is then placed in the LATENT state 154; this new state is written into the RAM 133 from the ROM 181 once it has been determined that the data is valid (this will be discussed later). A new data IOP interrupt is generated. The IOP responds by issuing the "next" command, which places the buffer section in the NO STAT state 155. The IOP examines the header to determine if it is a packet for which acknowledgement is required. If none is required as shown by line 156, the IOP issues the FREE command, changing to state 151. This new state is written into the RAM by the ROM182. If a status reply is necessary, the IOP constructs a status packet in the buffer section status area and then issues the transmit status command which changes the buffer section state to the STAT state 157. Eventually, the transmit hunter scans the buffer section in this STAT state 147 and causes a transfer through the state machine 134. On successful transmission, the RAM 133 is updated to the RCV HOLD state 158 through the ROM 181. This leads to the LOADING state 168 as indicated by line 159.

The empty hunter, after initialization, searches for an empty buffer section as indicated by line 161 and once a match occurs through ROM 180, the appropriate code for the EMPTY state 166 is written into the RAM 133. An IOP new empty buffer interrupt signal is generated. The IOP, through ROM 182, issues the "next" command which enters the LOADING code into the RAM as indicated by state 168 and invalidates the empty hunter. After loading the buffer section with data, the IOP is ready to transmit. If no acknowledgement is required, the IOP issues the transmit command which changes state to XMIT (169). The ROM 182 updates the RAM 133 to indicate the XMIT state. When the XMIT hunter finds the buffer section in the XMIT state, it triggers a transmission through the state machien 134. The ROM 181, after being notified of the successful transmission, frees the buffer as indicated by line 167.

If an acknowledgement is required, the IOP issues the XMIT-WAIT command, instructing the ROM 182 to change the state to XMIT-WAIT 162. Then the UNACKED state 163 follows when successful transmission has occurred. The buffer section remains in this state until state machine 134 receives the appropriate status packet. The ACKED state 164 follows when the status packet has been received. The state machine 134 through ROM 181 updates the RAM to the XMIT HOLD state 165. In this state, the IOP is informed that a status packet has been received, but the buffer section has not been freed. Once the status packet has been examined by the IOP and determined to be acceptable, then there is a return to the FREE state 151 as indicated by line 167.

G. IDENTIFICATION OF STATUS PACKETS

As previously mentioned, when data is transmitted and acknowledgement requested, the header for such transmission includes the sender buffer section number. This 4-bit number is shown in header 36 of FIG. 9. When the status packet is transmitted by the receiving node, the protocol unit 125 recognizes that a status packet is being transmitted from the bidding. For the first word of the status packet, the buffer number is taken directly from the system bus and used to address the buffer 117 and is also stored in SBUF. Note there is not sufficient time to otherwise process the buffer section number. For the second word of the status, the controller 135 uses the contents of SBUF to address the buffer 117.

H. DATA VALIDATION

Each adapter circuit on the system bus receives data (or status packets) each time there is a transmission over the system bus. Because of the speed at which the bus operates, there is not sufficient time to examine each transmission over the system bus, determine if it is intended for a particular node and then accept the data. Rather, the data is always accepted and the controller 135 examines the data to determine if the data is valid, that is, intended for the node. Referring again to FIG. 19, the state of a buffer section is changed from RECEIVING state 153 to latent state 154 only if the data is valid. If it is not valid, the buffer remains in the RECEIVING state 153 and new incoming data is simply written into the buffer over the existing invalid data.

Thus, a system has been described which employs distributed arbitration and provides separate arbitration mechanism for both status and data transmissions. The bus provides efficient means of transferring data, particularly between processors and input/output subsystems.

We claim:

1. A bus apparatus for interconnecting a plurality of nodes comprising:
   a first plurality of bus lines coupled to said nodes;
   a second plurality of bus lines coupled to said nodes;
   each of said nodes including;
   transceiver means for both transmitting onto and receiving from said first bus lines, first signals representative of data and said second bus lines, second signals representative of status;
   delay means for delay readying of untransmitted ones of said data signals until it has transmitted signals responsive to received ones of said data signals;
   priority storage means for storing signals representative of said nodes priority for access to said first and second bus lines, each of said nodes having a unique priority number stored in said priority storage means;
   adapter circuit means for coupling at least one of said nodes with an input/output bus, said adapter circuit means includes:
   a. an adapter buffer memory;
   b. selector means for selectively coupling said buffer memory to said input/output bus on said bus lines;
   c. a buffer state memory for storing signals representative of the state of said buffer memory;
   d. hunting means for examining the contents of said buffer state memory to identify locations in said buffer memory which are able to receive data from said input/output bus and from said first and second bus lines;
   e. addressing means coupled to said hunting means and said buffer memory for addressing locations in said buffer memory identified by said hunting means;
   interface circuit means for coupling between at least one of said nodes and said bus lines, said interface circuit means includes:
   a. an interface buffer memory for providing temporary storage of data being transferred between said one node and said bus lines, said buffer memory including a plurality of sections each of which is dedicated to receive data from a certain one of said nodes and to transmit data to a certain one of said nodes;
   arbitration means coupled to said first and second lines, said transceiver means and said storage means, said arbitration means includes:
   a. means for sending said priority number on said first lines when said node is ready to transmit said data signals;
   b. means for sending said priority number on said second lines when said node is ready to transmit said status signals;
   c. means for receiving priority numbers from said first and second lines from said nodes and comparing them with said node's priority number;
   d. means for causing said node to transmit said data or status signals on said first and second lines if said node has the highest priority and has sent its priority number on one of said first and second lines;
   e. means for updating said priority number by lowering said priority number if said node has transmitted data signals;
   whereby separate fair accessing said nodes to said first and second lines is maintained.

2. A bus apparatus for interconnecting a plurality of nodes comprising:
   a plurality of bus lines coupled to said anodes;
   a plurality of arbitration means, one coupled to each of said nodes for maintaining a unique priority number for each of said nodes, comprising:
   storage means for storing a priority number representative of that node's current access priority to said bus lines;
   transmission means for transmitting said current node priority on said bus lines when said node is ready to transmit data, said transmission means coupled to said storage means and to said bus lines;
   receiving means for receiving said priority number of others of said nodes and for comparing said other priority numbers with its own priority number, said receiving means enabling transmission of said data based on said comparison;
   updating means for updating said current node priorities, said updating means for maintaining a current node priority in each of said nodes which is different than the current node priority stored in the storage means of the other nodes;
   an adapter circuit for coupling at least one of said nodes with an input/output bus comprising:
   a. a buffer memory;

b. selective means for selective coupling said buffer memory to one of said input/output bus and said bus lines;
c. a buffer state memory for storing signals representative of the state of locations in said buffer memory;
d. hunting means for examining the contents of said buffer state memory to identify at least locations in said buffer memory which are able to receive data from said input/output bus and from said bus lines and to identify locations in said buffer memory which are ready to transmit data to said input/output bus, wherein hunting means provides dynamic allocation of locations in said buffer memory for data receiving from, and being transmitted to, at least some of said nodes;
e. addressing means coupled to said hunting means and said buffer memory for addressing locations in said bufer memory identified by said hunting means, said hunting means and address means includes: a plurality of registers for storing addresses for said buffer memory and a counter for addressing said buffer state memory, whereby when a match occurs between the contents of said buffer state memory and a condition for which said buffer state memory is being examined the count in said counter is stored in one of said registers;

wherein transmissions over said bus apparatus occur in bus cycles and wherein a first half of said bus cycle is used for communicating between said buffer memory and said input/output bus and the second half of said bus cycle is used for communicating between said bus lines and said buffer memory, and, whereby data may be efficiently transferred between said bus lines and said input/output bus through said buffer memory.

* * * * *